United States Patent

Hatouchi et al.

[11] Patent Number: 5,333,983
[45] Date of Patent: Aug. 2, 1994

[54] RACK ARRANGEMENT

[75] Inventors: Gokichi Hatouchi, Komaki; Hisao Saitoh, Omihachiman; Kiyoshi Shimizu, Hikone; Yasushi Hagisu, Shiga, all of Japan

[73] Assignee: Daifuku Co., Ltd., Osaka, Japan

[21] Appl. No.: 873,452

[22] Filed: Apr. 24, 1992

[30] Foreign Application Priority Data

| Apr. 26, 1991 | [JP] | Japan | 3-095923 |
| Dec. 26, 1991 | [JP] | Japan | 3-343718 |
| Dec. 27, 1991 | [JP] | Japan | 3-345688 |
| Jan. 21, 1992 | [JP] | Japan | 4-008007 |
| Jan. 29, 1992 | [JP] | Japan | 4-013488 |
| Feb. 7, 1992 | [JP] | Japan | 4-021523 |
| Mar. 11, 1992 | [JP] | Japan | 4-051971 |

[51] Int. Cl.⁵ ............................................... B65G 1/10
[52] U.S. Cl. .................................. 414/331; 364/478; 312/201; 211/1.57
[58] Field of Search ............. 414/331, 236, 237, 238, 414/267, 273, 274, 277, 279, 280, 281, 282, 283, 286; 312/201; 364/478; 211/1.51, 1.57

[56] References Cited

U.S. PATENT DOCUMENTS

| 3,730,358 | 5/1973 | Oji | 211/1.57 |
| 3,977,542 | 8/1976 | Stolzer | 414/331 |
| 4,307,922 | 12/1981 | Rhodes, Jr. | 211/1.57 X |
| 4,658,493 | 4/1987 | Saeki et al. | 211/1.57 X |

FOREIGN PATENT DOCUMENTS

| 2402912 | 8/1974 | Fed. Rep. of Germany | 211/1.57 |
| 2595335 | 9/1987 | France | 414/331 |
| 36001 | 2/1984 | Japan | 414/331 |
| 75310 | 3/1989 | Japan | 414/331 |
| 19044 | 4/1990 | Japan . |  |
| 8603178 | 6/1986 | PCT Int'l Appl. | 211/1.57 |
| 1243883 | 8/1971 | United Kingdom | 312/201 |

Primary Examiner—Frank E. Werner
Attorney, Agent, or Firm—Barnes, Kisselle, Raisch, Choate, Whittemore & Hulbert

[57] ABSTRACT

Rack arrangement designed for installation in, for example, a warehouse or a factory for storage of loads. A pair of stationary racks having a plurality of vertically and/or laterally partitioned storage spaces are arranged in spaced parallel relation. A movable rack or racks having a plurality of similarly partitioned storage spaces are arranged between the two stationary racks, with a working space defined between the facades of any selected pair of adjacent racks. A rail is mounted on the top of each stationary rack and supported thereon. A girder supported and guided by the pair of rails is movable along the length of the rails. A load transfer unit is supported and guided by the girder for movement within the working space. The load transfer unit includes a take-in/take-out device which is up-and-down movable within the transfer unit, able to support a load, and is retractably movable relative to a storage space for delivery of the load to and from the storage space.

15 Claims, 29 Drawing Sheets 5,333,983

RACK ARRANGEMENT

FIELD OF THE INVENTION

The present invention relates to a rack arrangement for installation in, for example, a warehouse or factory which provides for constantly efficient storage of loads and easy and safe load receiving and issuing operations.

BACKGROUND OF THE INVENTION

Rack arrangement using movable racks has been known. In Japanese Patent Publication No. 2-19044, for example, there is proposed a movable rack arrangement wherein a plurality of longitudinally extending movable racks are back and forth movably arranged within a space defined by a support structure and the like so that a working space may be provided in front of the facade of each of the movable racks. On the support structure side and above the movable racks are arranged in parallel opposed relation a pair of rails extending along the length of the movable racks, with arms adapted to be movably guided by the rails. There are also provided forks which are movably guided by the arms and upwardly and downwardly movable.

According to this known arrangement, by moving plural movable racks it is possible to provide a working space in front of the facade of a target movable rack. Each fork is movable within the working space through the movement of the associated arm, and transfer of a load to and from a target location is possible through the operation of the fork.

In such prior art arrangement, however, the rails must be rigidly fixed to the support structure through support members, such as brackets; and naturally the support members are large-sized, particularly in their vertical aspect. This makes it necessary to provide considerable space above the movable racks. In other words, the provision of the support structure for the rails results in decreased storage efficiency of the movable racks. Additionally, the support structure must be large-sized in order to sustain the arm-side load.

SUMMARY OF THE INVENTION

It is a primary object of the invention to provide a rack arrangement which permits rails to be securely laid without use of any special support structure, simplifies the support structure for rails, and provides maximum possible improvement in storage efficiency.

In order to accomplish this object, according to the invention there is provided a rack arrangement including a pair of longitudinally extending stationary racks having a plurality of vertically and/or laterally partitioned storage spaces and arranged in parallel spaced apart relation, a longitudinally extending movable rack or racks having a plurality of vertically and/or laterally partitioned storage spaces and frontwardly and rearwardly movably disposed between the stationary racks, and a working space defined between opposed facades of any selected pair of adjacent racks, comprising:

a pair of rails mounted respectively on the tops of said stationary racks and supported thereon, a girder supported by the rails and guided thereby for movement along the rails, movable means supported and guided by the girder for movement in a longitudinal direction of the girder which is perpendicular to said rails, said movable means being movable into said working space, and a take-in/take-out device which is vertically movable within the movable means and capable of supporting a load for storage into one of said storage spaces, said take-in/take-out device being adapted to extend into and retreat from a storage space located opposite to said movable means for transfer of the load to and from a storage space.

According to such arrangement of the invention, the rails are mounted on the tops of the stationary racks and supported thereon, whereby direct rail laying is substantially achieved, it being only necessary to use fixing members of simple construction. The load of the girder supported by the pair of rails can be firmly supported on the floor by utilizing the pair of stationary racks as a support structure. Therefore, any special structure for supporting such load is not required.

DESCRIPTION OF THE EMBODIMENTS

Figure 1:
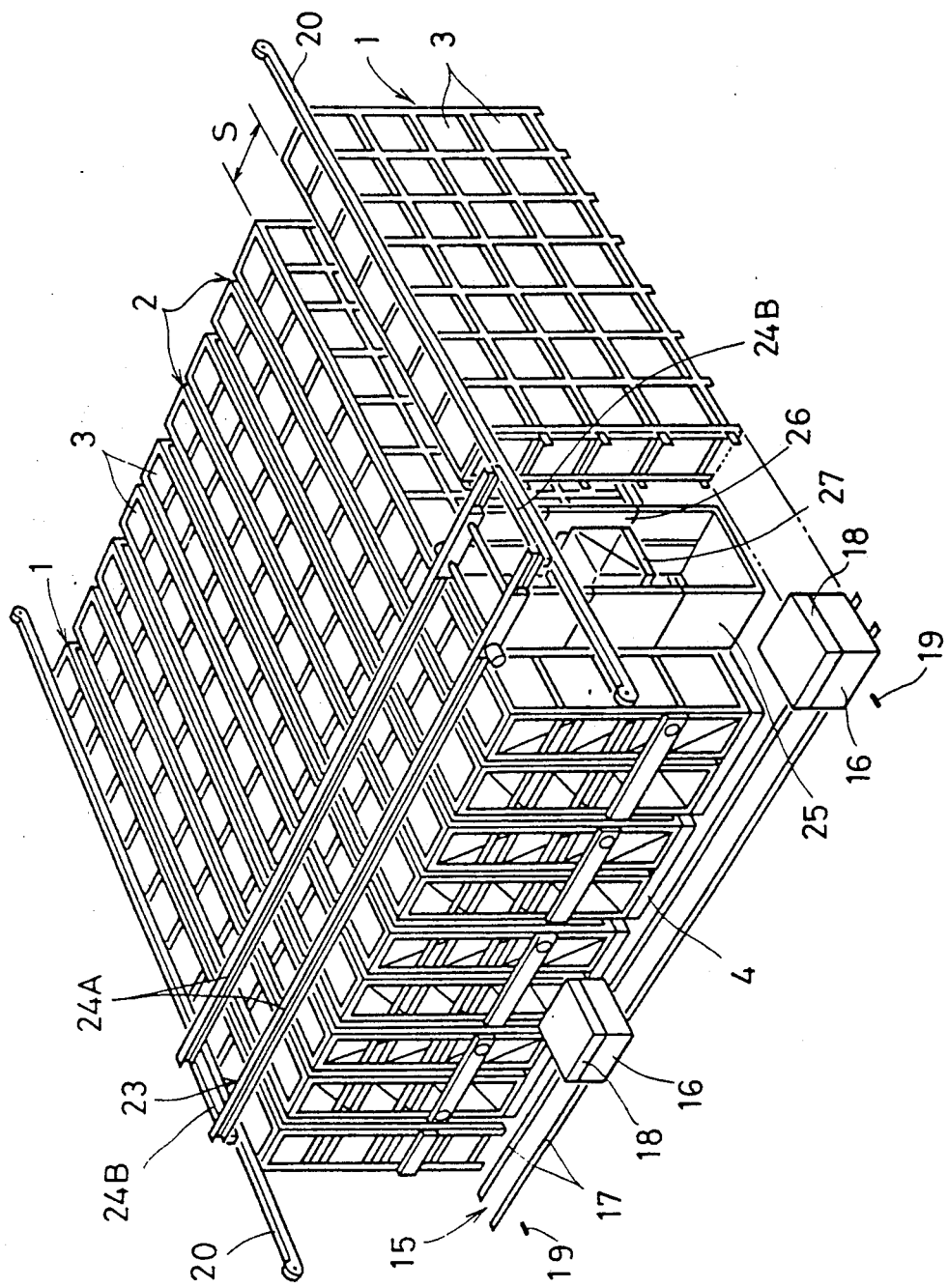
FIG. 1 is a perspective view of a rack arrangement representing one embodiment of the invention.
Figure 2:
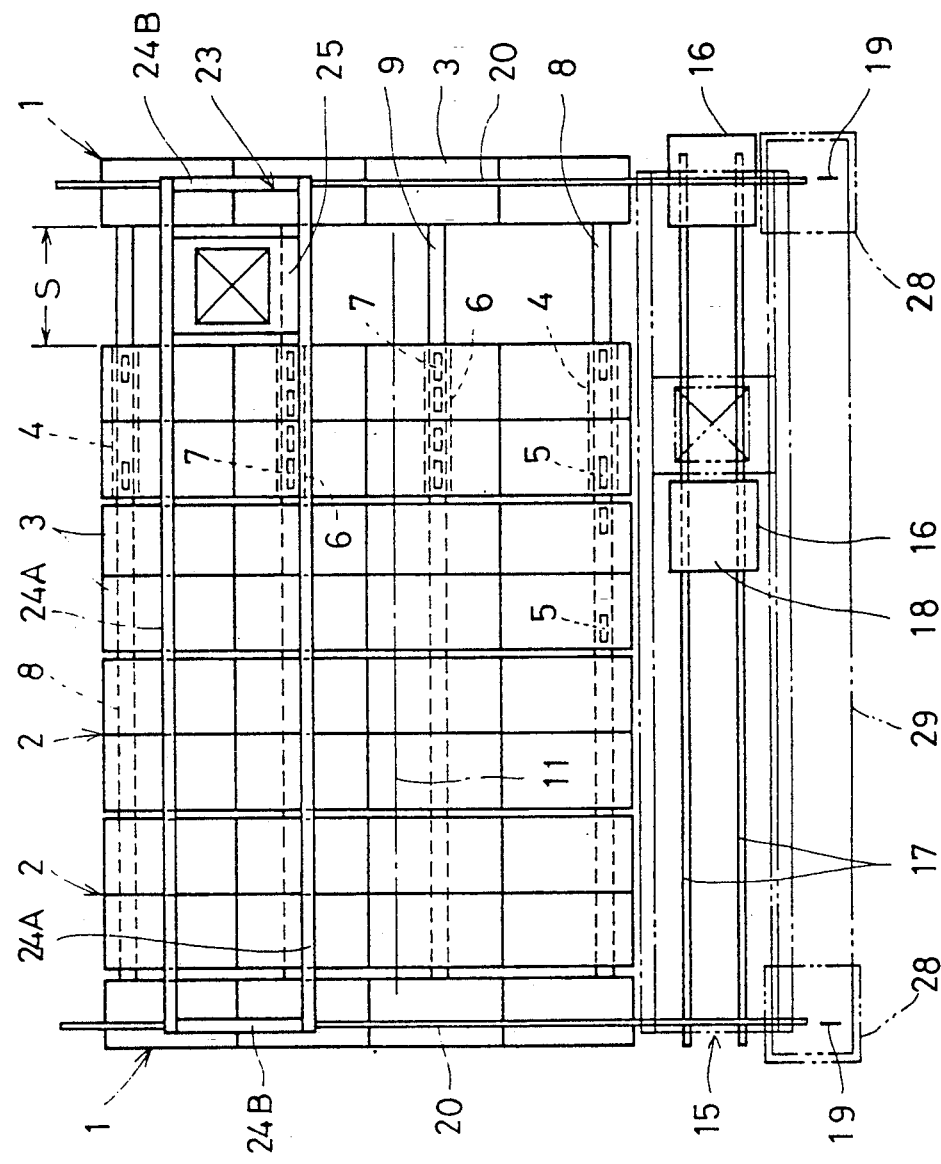
FIG. 2 is a plan view of the rack arrangement in FIG. 1.
Figure 3:
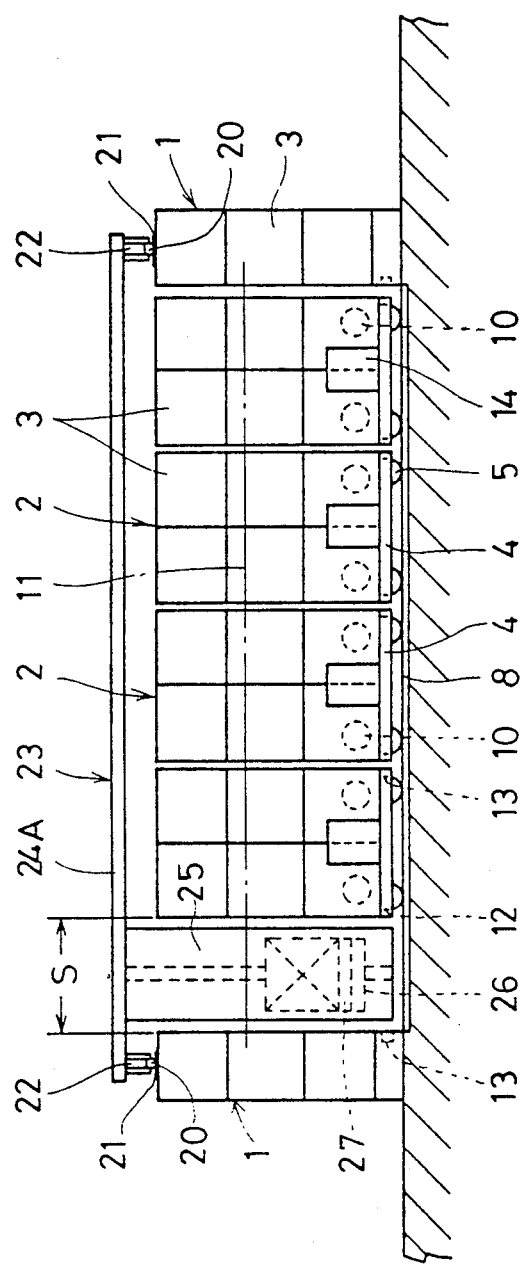
FIG. 3 is a side view of the rack arrangement in FIG. 1.

In FIGS. 1 to 3, reference numeral 1 designates a pair of longitudinally extending stationary racks arranged in parallel and spaced apart from each other. A plurality of longitudinally extending movable racks 2 which are frontwardly and rearwardly movable, that is, movable toward and away from the stationary racks 1, within the space defined therebetween, are arranged in parallel rows between the stationary racks 1. Racks 1, 2 each have a plurality of vertically and laterally partitioned storage spaces 3. Each movable rack 2 includes lower side frames 4 disposed at opposite ends thereof which carry two flanged wheels 5 each, front and rear, spaced apart in a transverse direction. A pair of lower intermediate frames 6, provided at inner locations, are each partitioned into halves, each half carrying a pair of nonflanged wheels 7 spaced apart in a transverse direction.

Each movable rack 2 is mounted through wheels 5, 7 on rails 8, 9 laid on the floor and has a motor (driving unit) 10 mounted thereon which is geared to the nonflanged wheels 7, the movable frame 2 being therefore independently back and forth movable on a predetermined track 11 which is perpendicular to a longitudinal direction of the rack 2. The distance between the pair of stationary racks 1 is so designed as to provide between the facade of one of the stationary racks 1 and the facade of one movable rack 2 at least one working space S which is slightly longer than the depth (transverse dimension) of the above said partitioned storage space.

Each lower intermediate frame 6 has a gantry-shaped rail-like configuration, and at opposite ends thereof there are mounted a photoelectric switch 12, an example of a transmitter-receiver for transfer of a movement control signal, a reflector plate 13 for light projection and reception by the photoelectric switch 12, etc. At corresponding locations in the stationary frames 1 there are also mounted photoelectric switches 12 or reflector plates 13. A control unit 14 is provided on the exterior of each movable rack 2 at one side thereof.

A load handling area 15 is provided at a location external of one end of the longitudinally extending racks 1, 2, and in the load handling station 15 there is disposed a load holder block 16 which is reciprocatively movable in a transverse direction relative to the racks, that is, in a direction extending along the predetermined track 11. The load holder block 16 is of the free-running type and is supported and guided through wheels, or the like on rails 17 laid on the floor extending along the rails 8, 9, the load holder block 16 having a load support bed 18 formed on the top thereof.

Longitudinally extending crane rails 20 are laid on the respective tops of the stationary racks 1 through fixing members 1. A girder 23 supported on and guided by the crane rails 20 through wheels 22 is movable at a level above both the racks 1, 2 and the load handling station 15 in a longitudinal direction of the racks 1, 2. The girder 23 is elongated frame-shaped and comprises a pair of guide portions 24A perpendicular to the crane rails 20, and a pair of carriage portions 24A interconnecting the guide portions 24A at opposite ends thereof, the carriage portions 24B carrying wheels 22 through which the girder 23 is mounted on the crane rails 20 in rolling contact therewith.

The girder 23 is equipped with a transfer unit 25 which is suspendedly supported by the two guide portions 24A for movement in transverse relation to a longitudinal direction of the racks. The transfer unit 25 has a box configuration which is open at front and rear sides, and a front-to-rear side length designed to be slightly smaller than the front-to-rear length of the working space S so that the transfer unit 25 is movable in a longitudinal direction of the racks. The transfer unit 25 is provided with an up-and-down movable carriage 26 in which are disposed take-in/take-out devices 27 which are retractably extensible in a transverse direction relative to the racks, that is, extensible toward and retractable from adjacent opposed racks 1, 2.

Movement of load holder unit 16 is controlled suitably by a known free-running truck control system; travel of girder 23 and movement of transfer unit 25 by a known overhead crane control system; and upward and downward movement of carriage 26 and extension and retraction of take-in/take-out device 27 by a known automatic warehousing crane control system.

Nextly, operation of the rack arrangement of the above described construction will be explained.

When delivery of a load is to be effected between girder 23 and load holder block 16, girder 23 is first caused to travel to a position above the load handling area 15 through support and guidance by crane rails 20, then transfer unit 25 is positioned in the load handling area 15. Then, load holder block 16 is moved from its home position 19 toward transfer unit 25 through support and guidance by rails 17 and is stopped at a position adjacent the transfer unit 25. In that condition, an ascending and descending operation of carriage 26 and an extending and retracting operation of take-in/take-out device 27 are carried out in combination so that delivery is effected between the transfer unit 25 and the load holder block 16.

Then, movable racks 2 are moved so as to provide a working space S in front of a target partitioned storage space 3. In this case, movement of movable racks 2 is carried out by driving motor 10 to bring non-flanged wheels 7 into forced rotation, so that the racks 2 are moved on the predetermined track 11 while they remain supported on rails 8, 9 through wheels 5, 7. During this process of movement, issue and receipt of a movement control signal is effected through light projection from photoelectric switch 12 and reflection of the light by reflector plate 13, or otherwise, so that movement of the movable racks 2 is effectively controlled without involving collision with one another.

When working space S has thus been formed, transfer unit 25 is moved until it is positioned at a location external of one end of the working space S. The movement of the transfer unit 25 is stably effected without possible sway because the transfer unit 25 is supported and guided by two guide portions 24A. It is to be noted that load holder block 16 is moved to its home position 19 prior to movement of transfer unit 25. When load holder block 16 has stopped at the home position 19, delivery of the article is made, for example, from a forklift truck to load holder block 16.

Transfer unit 25 is positioned at a location external of one end of the working space S as stated above, and the transfer unit 25 is moved within the working space S. In this case, the transfer unit 25 will never sway in the direction of its movement because it is supported by two guide portions 24A. Then, the transfer unit 25 is brought to a halt in front of a target partitioned storage space 3 in opposed relation thereto. In this condition, an ascending and descending operation of carriage 26 and extending and retracting operation of take-in/take-out device 27 are carried out in combination, it being thus possible to perform load storing into and/or load picking from target storage space 3.

Crane rails 20 may be installed almost directly on the stationary racks 1 only by using simple fixing members 21, and the load of the girder supported by the pair of crane rails 20 can be satisfactorily supported on the floor side utilizing the stationary racks 1 as a support structure. Therefore, the crane rails 20 can be rigidly installed without requiring any special support structure. Thus, it is possible to compactly arrange the girder 23 at a level above the movable racks 2 and to thereby improve the storage efficiency of the movable racks 2.

In the above described embodiment, it is arranged that load delivery is done by a forklift truck onto load holder block 16 at a halt at home position 19. Alternatively, it may be arranged that as shown in phantom in FIG. 2, a stationary load holder block 28 is disposed in opposed relation to the home position 19, or a storage conveyor 29 is provided outside the travel path of the load holder block 16 so that load delivery may be performed between the storage conveyor 28 and the load holder block 16.

Figure 4:
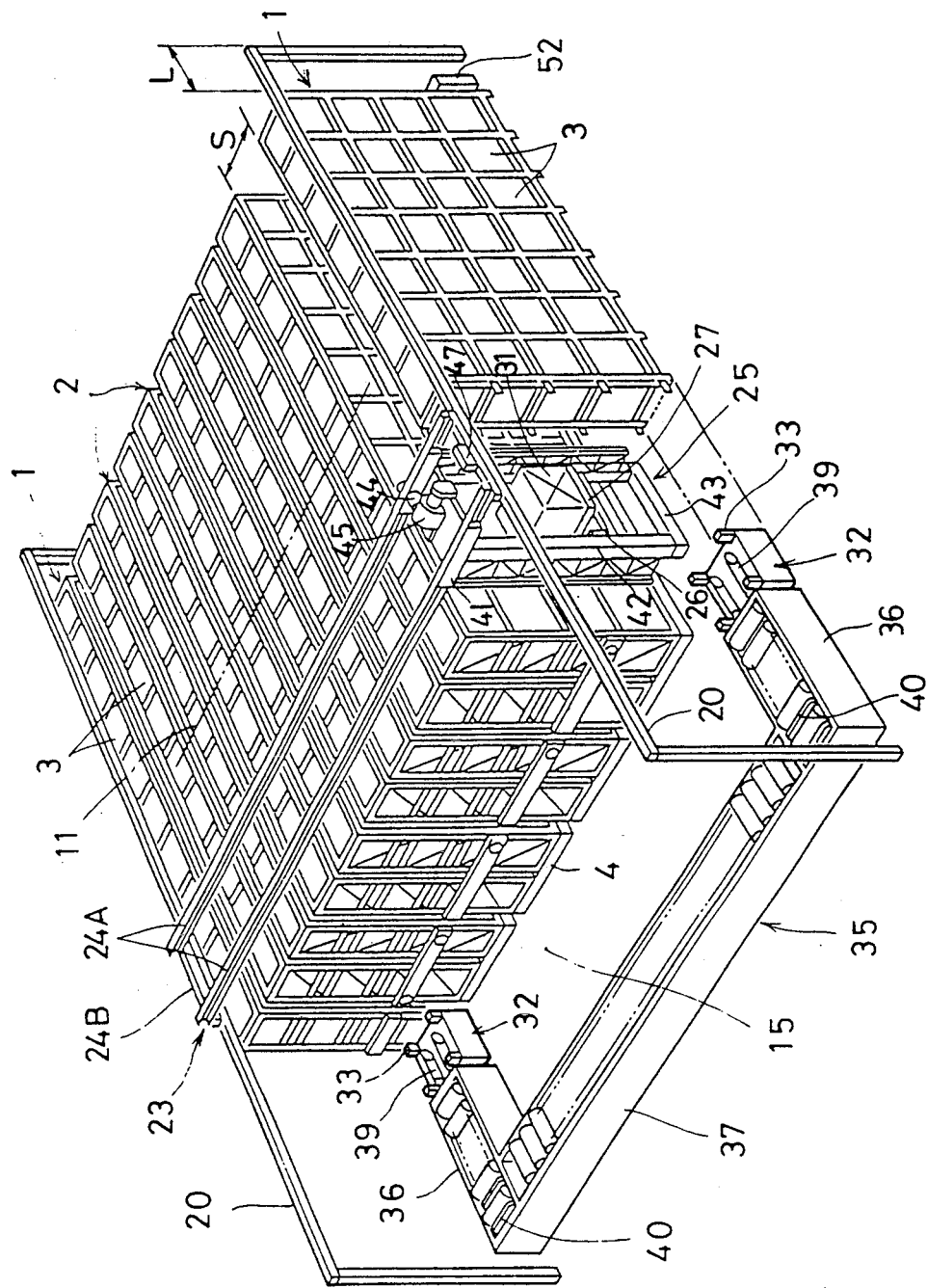
FIG. 4 is a perspective view of a rack arrangement representing another embodiment of the invention.
Figure 5:
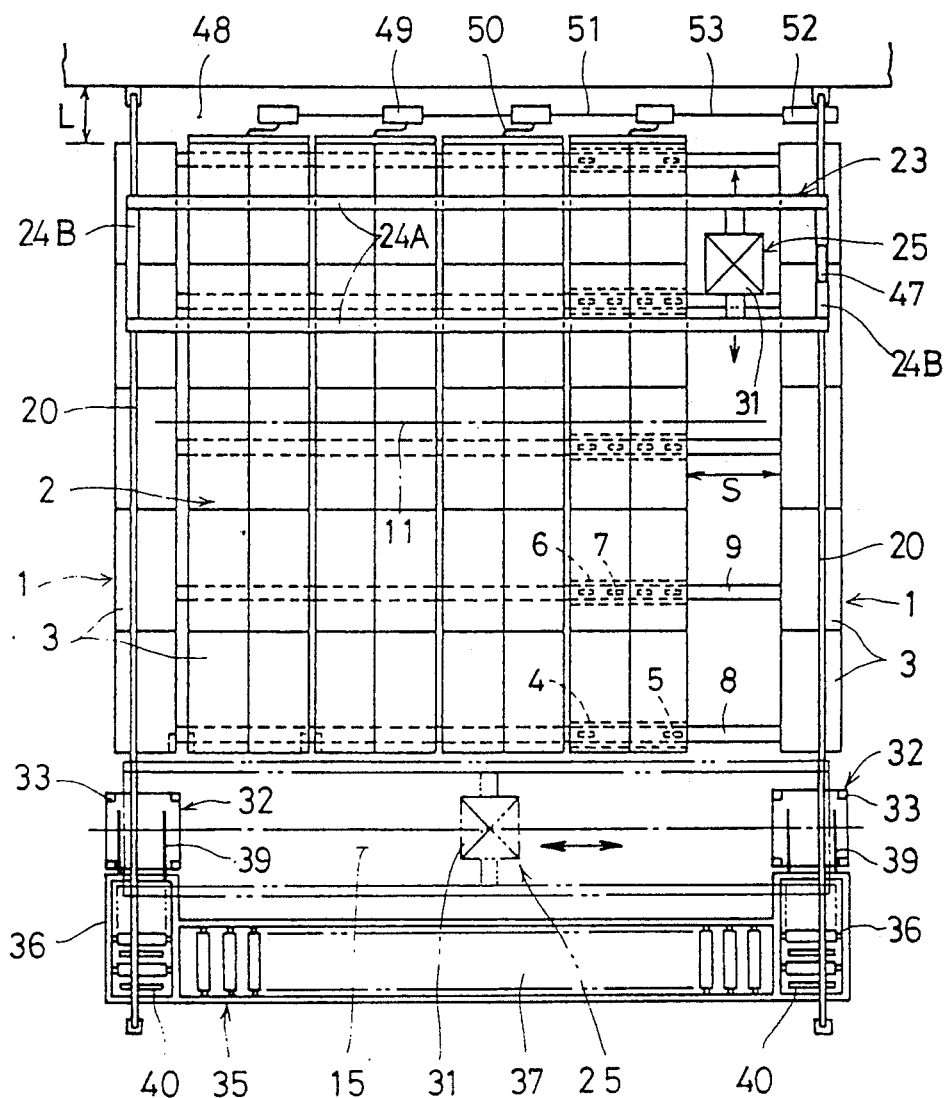
FIG. 5 is a plan view of the rack arrangement in FIG. 4.

FIGS. 4 and 5 illustrate another embodiment of the invention.

Within a load handling area 15 external of one end of the longitudinally extending racks 1, 2 and at locations external of respective one ends of the stationary racks 1, there are disposed load holder blocks 32 for delivery of load 31 to and from a transfer unit (to be described hereinafter). Each load holder block 32 is anchored to the floor and has load support members 33 extending upright from the upper four corners thereof.

A conveyor unit 35 is provided opposite the racks 1, 2 across the load handling station. The conveyor unit 35 comprises a pair of delivery portions 36 extending from the respective sides of the load holder blocks 32 in a direction opposite from the stationary racks 1, and a storage portion 37 connecting the outer ends of the delivery portions 36 and positioned outside of the load handling area 15, and has a U-shape configuration in plan. The presence of the delivery portions 36 prevents a post 42 of the transfer unit 25 from colliding against the storage portion 37.

Each delivery portion 36 is equipped at one end with a first delivery member 39 for making delivery of load 31 to and from the corresponding load holder block 32, and at the other end with a second delivery member 40 for making delivery of load 31 to and from the storage portion 37. More specifically, the conveyor unit 35 consists essentially of a roller conveyor and the like, and the delivery elements 39, 40 each consist essentially of a chain conveyor or the like which is upwardly and downwardly movable between rollers of the chain conveyor.

The pair of crane rails 20 extends at one end to a location above the load handling area 15 and at the other end a predetermined distance L outwardly beyond the other end of the pair of stationary racks 1. The body of the transfer unit 25, suspendedly supported by the girder 23, comprises an upper frame 41 which is supported and guided by the guide portions 24A through wheels, posts 42 depending from opposite ends of the upper frame 41, and a lower frame 43 connecting the lower ends of the posts 42, and has a box-shaped configuration which is open at the front and rear sides. The upper frame 41 carries a transverse drive gear 44 geared to the wheels. A carriage 26 is disposed between the posts 42 and is upwardly and downwardly movable through operation of a vertical drive gear 45 disposed on the upper frame 41.

When the girder 23 is driven by a run drive gear to move to one end of the pair of crane rails 20, the transfer unit 25 is wholly positioned in the load handling area 15 so that it can perform delivery of load 31 from and to the load holder block 32. When the girder 23 moves to the other end of the pair of crane rails 20, the transfer unit 25 is so positioned that a portion of the upper frame 41 and one of the posts 42 which is more adjacent to the other end of crane rail 20 enter a space 48. Thus, the transfer unit 25, the width of which is less than the width of the girder 23, can assume a position opposite to a partitioned storage space 3 located at the other end of rack 1, 2.

The space 48 is provided externally of the other end of the longitudinally extending racks 1, 2 because of the fact that the length of the crane rails 20 is outwardly extended at the other end of the rails by a predetermined distance L. Control devices 49 for respective movable racks 2 are arranged on the floor within this space 48. Each control device 49 is connected to the corresponding movable rack 2 through a branch cable 50. The control devices 49 and branch cables 50 are so designed and arranged that they are held in position within the limits of movement of the movable racks 2 when the racks are moved in either leftward or rightward direction. Adjacent control devices 49 are interconnected by sub-cables 51 arranged on the floor. In the space 48 at a location opposite to one of the stationary racks 1 there is provided a centralized control system 52 which is connected to an adjacent one of the control devices 49 via a main cable 53. These cables 50, 51, 53 perform signal transmission and reception, and power supply.

Nextly, operation of the rack arrangement of this embodiment will be explained.

For entry of load 31 into storage, load 31 is first delivered to the storage portion 37 by a forklift or the like. In this case, the fork acts on a pallet on which the load 31 is supported and thereafter the load 31 is handled through the pallet. The load 31 delivered onto storage portion 37 is transported in one or the other direction through the conveying effort of the storage portion 37 until it is delivered to delivery portion 36 through second delivery element 40. Then, load 31 is transported by conveying effort of delivery portion 36 until it is delivered to load holder block 32 through first delivery element 39. Load 31, when delivered to load holder block 32, is supported by load support members 33.

Then, girder 23, supported and guided by crane rails 20, is moved toward one end of the crane rails 20 until it reaches a location above the load handling area 15, so that empty transfer unit 25 is positioned in the load handling area 15. Then, transfer unit 25 is driven by traverse drive gear 44 to move and is stopped at a position adjacent load holder block 32. In that condition, an ascending and descending operation of carriage 26 and an extending and retracting operation of take-in/take-out device 27 are carried out in combination, so that load 31 on the load holder block 32 is received by transfer unit 25.

Subsequently, entry of load 31 into a target storage space 3 or load picking therefrom is carried out in the same manner as in the case of the embodiment shown in FIGS. 1 to 3. Movement of movable racks 2 in that connection is carried out in a manner such that an instruction signal from centralized control system 52 is transmitted to a target control device 49 via main cable 53 and sub-cable 51 and, in turn, an instruction signal from the control device 49 is transmitted to movable racks 2 via branch cable 50.

Entry of load 31 into the target storage space is carried out by a combination of up-and-down motion of carriage 26 and an extending and retracting motion of take-in/take-out device 27 after the transfer unit 25 is stopped in front of the storage space 3.

For outward delivery of load 31, the load 31 is first taken out from target storage space 3 by transfer unit 25 and, in turn, the transfer unit 25 in which the load 31 is supported is moved in the working space S and toward the load handling area 15.

Upon its arrival at load handling area 15, the transfer unit 25 is moved within the load handling area in a longitudinal direction thereof and is stopped at a location adjacent one of the load holder block 32. In this condition, an upward and downward movement of carriage 26 and an extending and retracting movement of take-in/take-out device 27 are carried out in combination, whereby the load 31 on the transfer unit 25 is delivered onto the load holder block 32. Then, the load 31 on the load holder block 32 is transferred to delivery portion 36 through first delivery element 39 and is transported by the conveying effort of the delivery portion 36. The load 31 is then delivered onto storage portion 37 via second delivery element 40 and is transported to a given location on the storage portion 37. Thereafter, the load 37 is fetched by a forklift truck or the like.

Conveyor unit 35 is utilized for inward and outward load handling as described above, and additionally it is employed for an order picking operation. In particular, the order picking operation is carried out in the following way. Loads 31 are sequentially taken out from racks 1, 2 by using one of the load holder blocks 32 and they are conveyed on storage portion 37 in one direction. Thereafter, order picking is made from a side of the storage portion 37. The remaining loads 31 are sequentially stored into racks 1, 2 via the other load holder block 32.

In this embodiment, a load handling area 15 is provided externally of only one end of the longitudinally extending racks 1, 2. Alternatively, however, a similar load handling area, together with a conveyor unit, may also be provided externally of the other end of the racks 1, 2.

Figure 6:
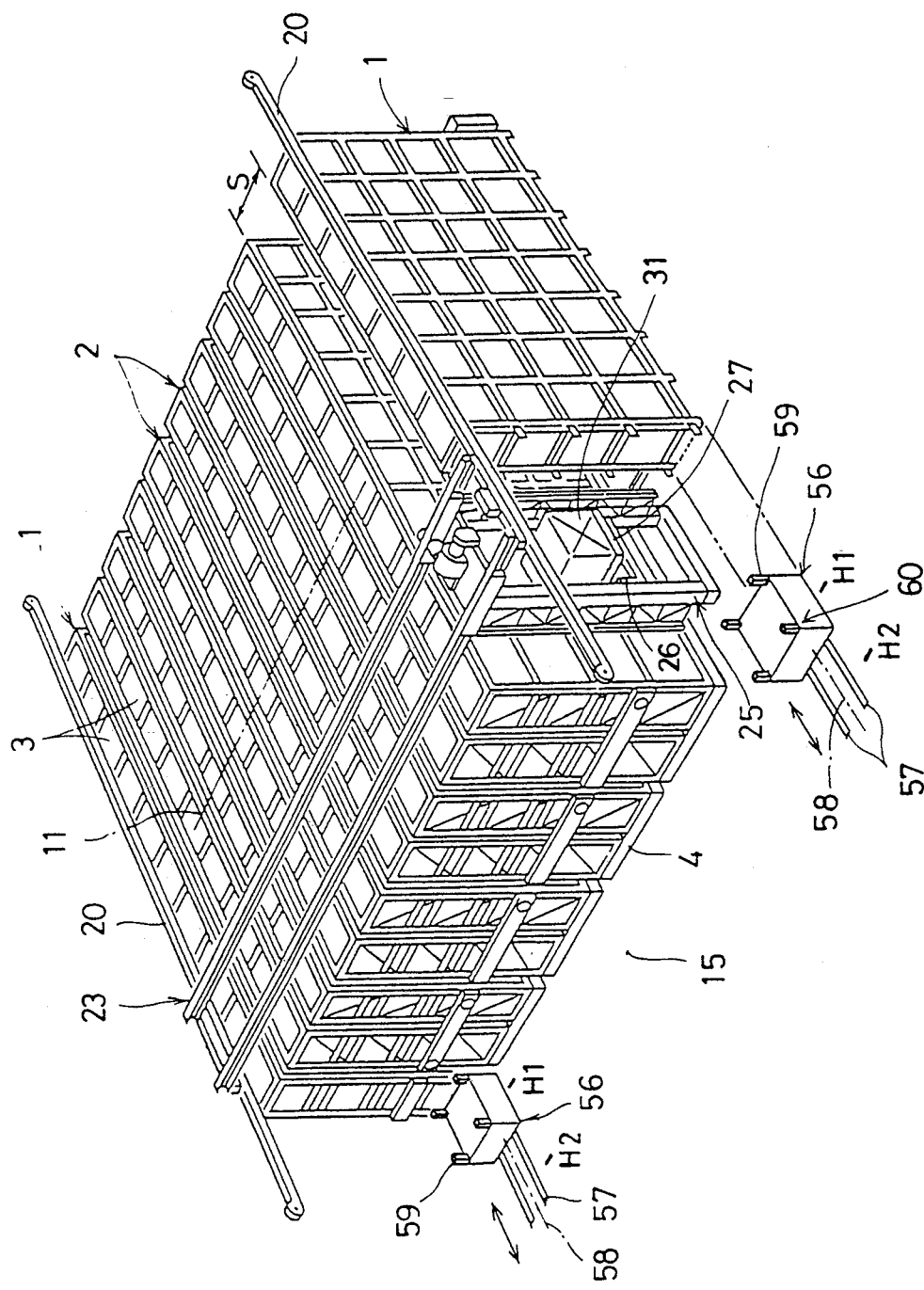
FIG. 6 is a perspective view of a rack arrangement representing a further embodiment of the invention.
Figure 7:
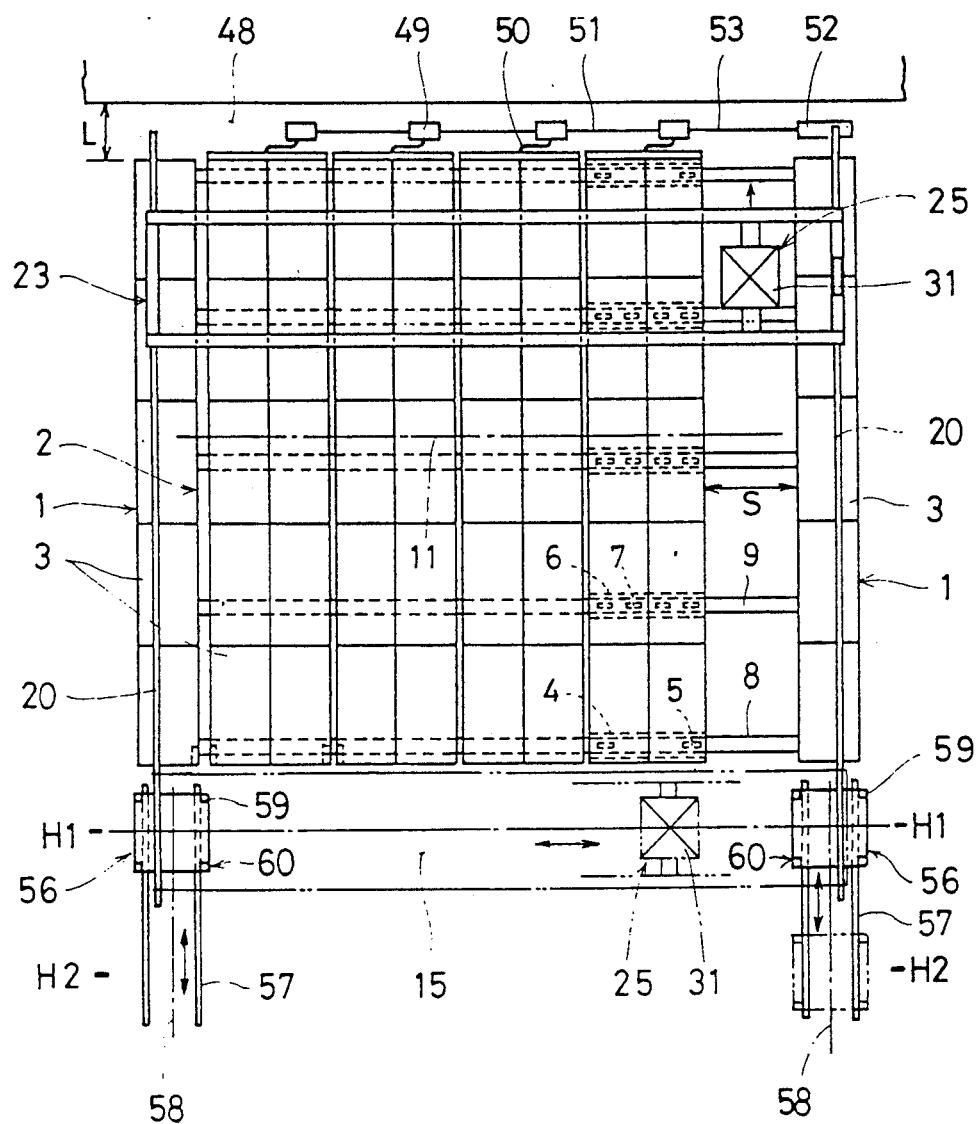
FIG. 7 is a plan view of the rack arrangement in FIG. 6.

FIGS. 6 and 7 illustrate a further embodiment of the invention. Load holder blocks 56 adapted for delivery of load 31 to and from the transfer unit 25 are disposed in opposed positions in a load handling area 15 external of one end of the longitudinally extending stationary racks 1. The load holder blocks 56 are of the self-drive type such that each, being supported and guided, through wheels, by rails 57 laid on the floor, is reciprocatively movable on a travel path 58 extending longitudinally away from one end of stationary rack 1. Each load holder block 56 has a load bearing portion 60 with upstanding load support members 59 at four corners thereof. Two home positions are set for each load holder block 56, that is, a first home position H1 located close to the adjacent stationary rack 1, and a second home position H2 located remote from the stationary rack 1.

When the girder 23, supported and guided by the crane rails 20, is moved to one end of the rails 20, the transfer unit 25 is wholly positioned in the load handling area 15 to become ready for delivery of load 31 to and from load holder block 56.

Nextly, operation of the rack arrangement of the present embodiment will be explained.

For entry of load 31 into storage, empty load holder block 56 is first positioned at second home position H2, and load 31 is delivered onto load bearing portion 60 by a forklift truck or the like. In this case, the fork acts on individual load support members 59 to cause the load 31 to be suitably supported by the load support members 59. Then, the load holder block 56 moves along the travel path 58 until it stops at first home position H1.

When this condition is reached, initially girder 23, supported and guided by crane rails 20, moves toward a location above load handling area 15 and thus empty transfer unit 25 reaches load handling area 15. Then, the empty transfer unit 25 moves in a transverse direction relative to the crane rails until it stops at a position close to load holder block 56 at first home position H1. In this condition, the transfer unit 25 receives load 31 from the load holder block 56.

For outward delivery of load 31, transfer unit 25 picks load 31 from a target storage space 3 in the same manner as in the case of the previous embodiment. The transfer unit 25 in which the load 31 is supported moves through the working space S into the load handling area 15, then stops.

Upon arrival at the load handling area 15, the transfer unit 25 moves in a transverse direction relative to the crane rails until it stops at a position close to empty load holder block 56 that is at a halt at first home position H1. In this condition, up-and-down movement of carriage 26 and extension and retraction of take-in/take-out device 27 are carried out in combination, so that the load 31 in the transfer unit 25 is delivered onto the load holder block 56. Subsequently, the load holder block 56 moves on travel path 58 until it reaches second home position H2, at which it stops. The load 31 on the load holder block 56 is fetched by forklift truck or the like for outward delivery.

Figure 8:
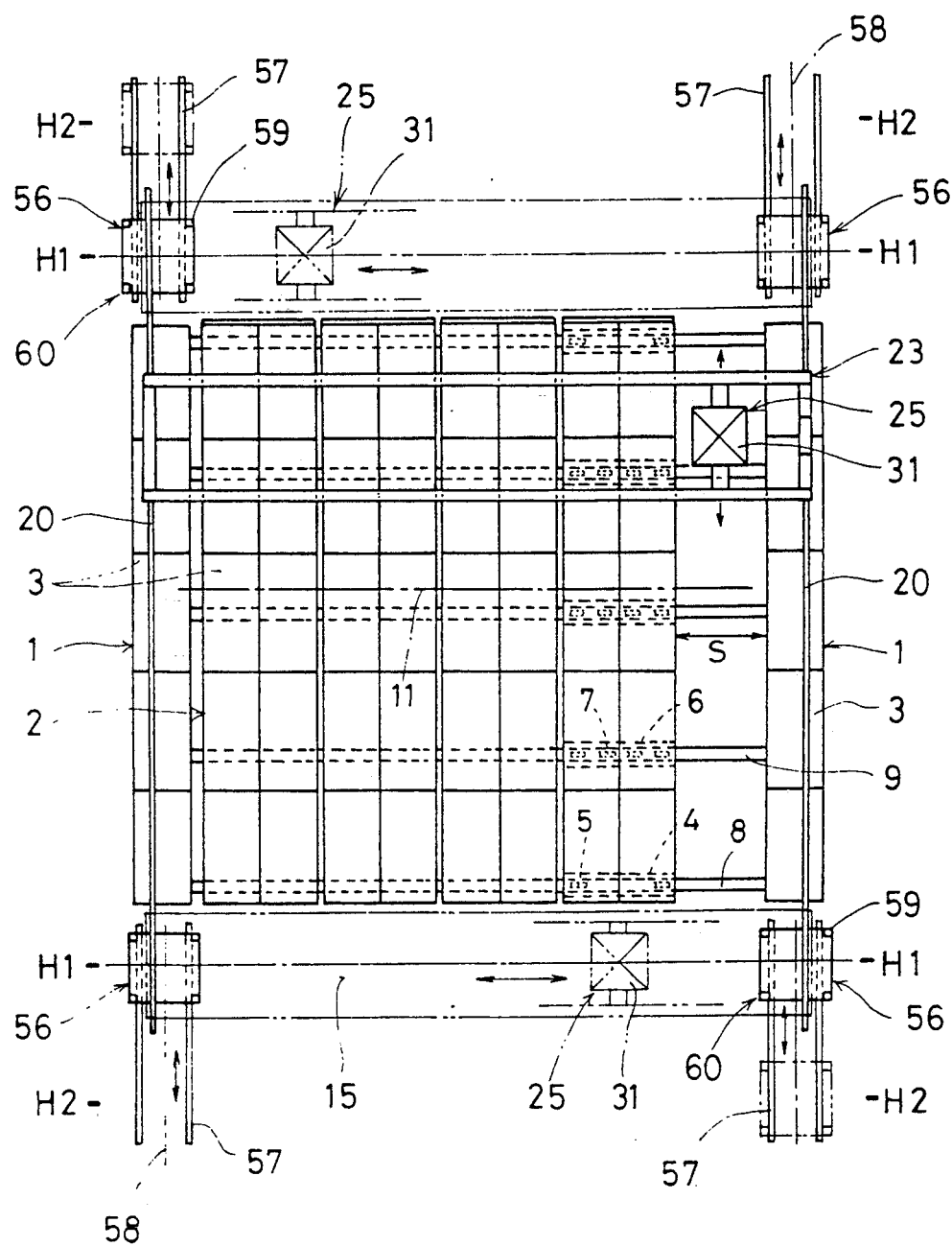
FIG. 8 is a plan view of a rack arrangement representing a still further embodiment of the invention.

FIG. 8 shows a still further embodiment of the invention. In this embodiment, load handling areas 15 are provided externally of opposite ends of the racks 1, 2, and pairs of load holder blocks 56 are disposed in the load handling areas and outside the opposite ends of the pair of opposed stationary racks 1. According to the arrangement of this embodiment, entry of loads 3 into storage and outward delivery of loads 3 are carried out utilizing spaces external of opposite ends of the racks 1, 2. In this case, control devices 49 and the like described with reference to FIG. 5 are arranged in racks 1, 2.

Figure 9:
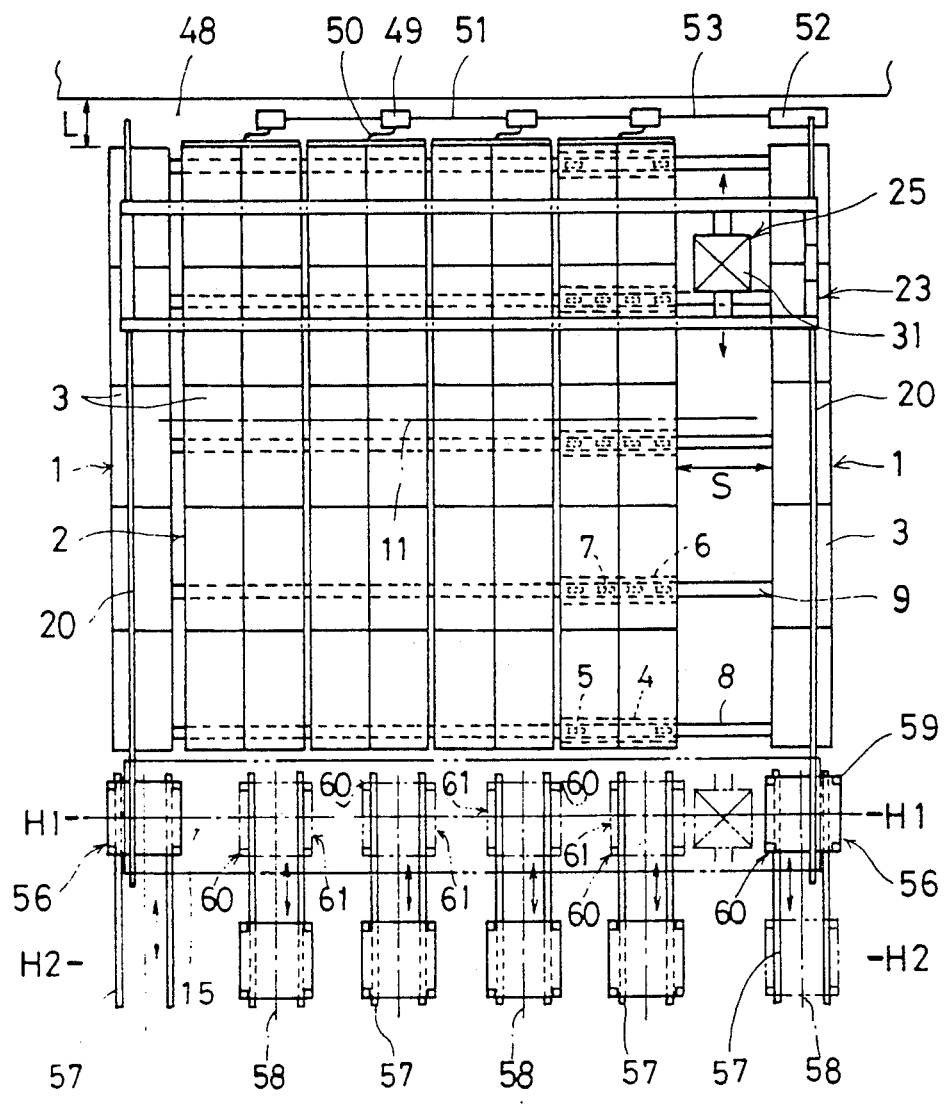
FIG. 9 is a plan view of a rack arrangement representing another embodiment of the invention.

FIG. 9 is another embodiment of the invention. In this embodiment, load holder devices 56 adapted for delivery of load 3 to and from the transfer unit 25 are provided in the load handling area 15 at opposite positions outside the respective ends of the stationary racks 1 and, in addition at least one intermediate load holder block 61 (four shown in number) is disposed between the two load holder blocks 56. The intermediate load holder block 61 is of the same construction as the load holder blocks 56 and is able to perform delivery of load 3 to and from the transfer unit 25 when it is positioned within the load handling area 15. In case that the intermediate load holder block 61 is likely to interfere with the movement of the transfer unit 25 within the load handling area 15, it is caused to retreat from the load handling area 15 and is positioned at the second home position H2.

In these embodiments shown in FIGS. 6 to 9, the or each load holder block may be moved between the first home position HI at which delivery of load 31 to and from the transfer unit 25 is to be performed and the second home position H2 at which delivery of load 31 to and from an external device, such as forklift truck, is to be performed. Therefore, it is possible to operate such external device safely and without any possibility of collision between the forklift truck or the like and the transfer unit 25 relative to the load holder block 56. The or each load holder block 56 does not move toward and away from (move back and forth relative to) the transfer unit 25 within the load handling area 15. Therefore, they can be safely operated without possible collision with each other and their movement can be controlled in a very simple way. Furthermore, delivery of load 31 between the load holder block 56 and the transfer unit 25 can be accurately performed without involving any error.

Figure 10:
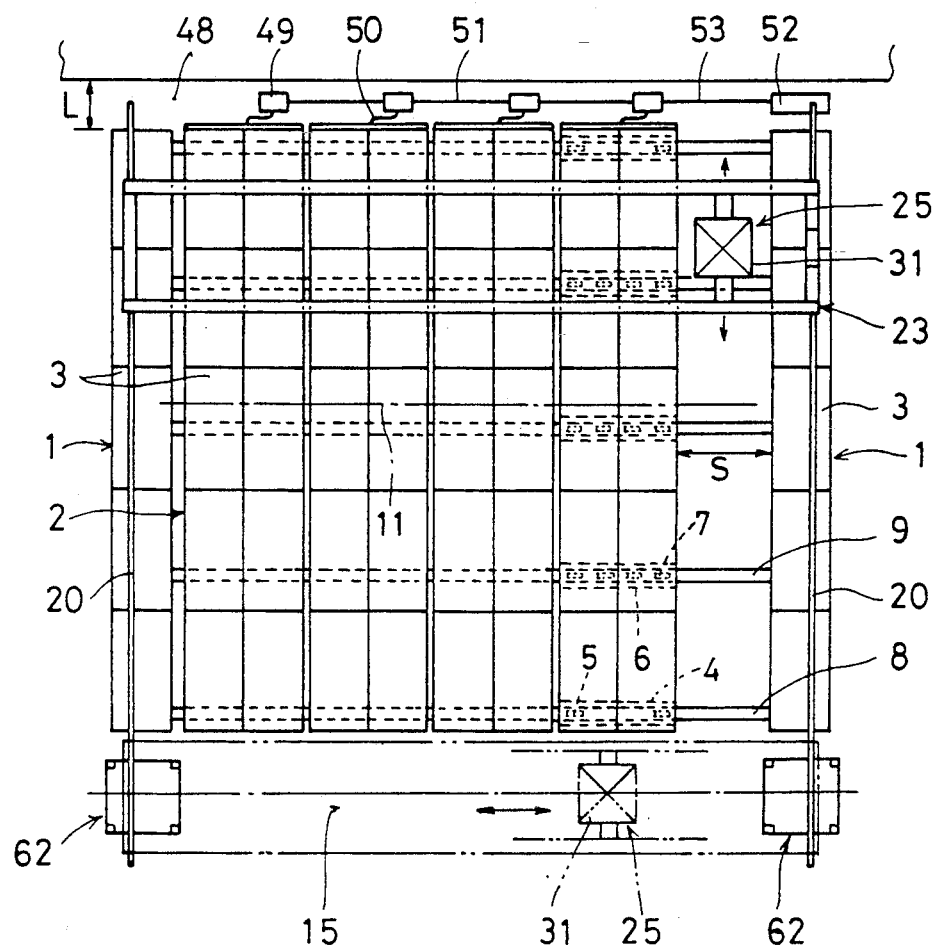
FIG. 10 is a plan view of a rack arrangement representing still another embodiment of the invention.
Figure 11:
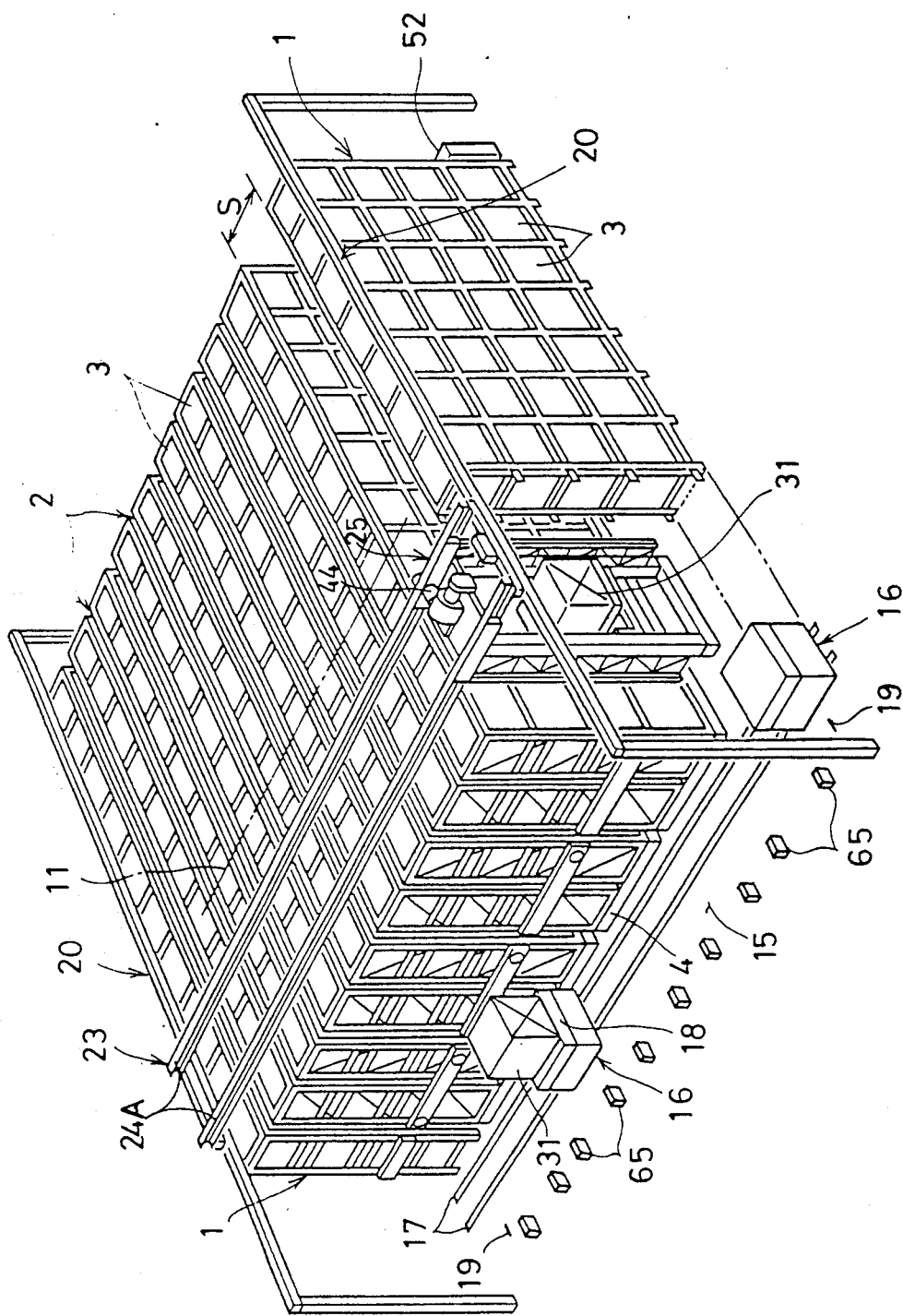
FIG. 11 is a perspective view of a rack arrangement representing a further embodiment of the invention.
Figure 12:
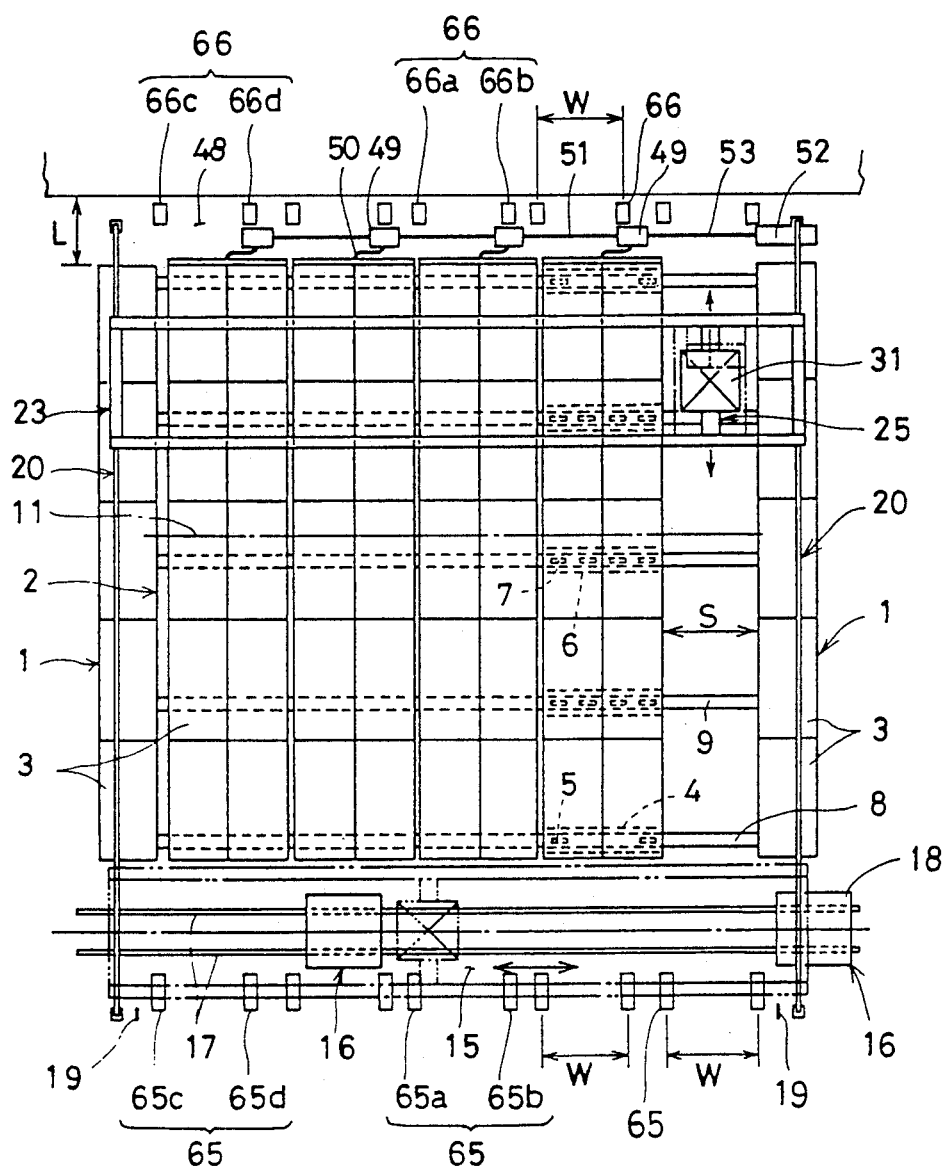
FIG. 12 is a plan view of the rack arrangement shown in FIG. 11.

FIG. 10 shows a further embodiment of the invention. In this embodiment, load holder blocks 62 adapted for delivery of load 31 to and from the transfer unit 25 are fixedly disposed in the load handling area 15 at opposite positions outside the respective ends of the pair of stationary racks 1. In this embodiment, delivery of load 31 can be performed by a forklift truck or the like without movement of load holder block 62.

FIGS. 11 to 15 show a still further embodiment of the invention. In this embodiment, a pair of load holder blocks 16 are provided as in FIG. 1 embodiment, the load holder blocks 16 being self-movable by being guided along by a pair of rails 17 longitudinally extending in the same direction as the girder 23.

At locations external of the respective ends of individual racks 1, 2 are arranged, in opposed relation, light projectors 65, each consisting of a photoelectric switch as an exemplary form of a width detecting device, and light receptors 66 for detecting light projected from the light projectors 65. More particularly, light projectors 65 are arranged along the outer edge portion of the load handling area 15, and light receptors 66 are arranged along the outer edge portion of a space 48. These light projectors 65 and light receptors 66 are arranged in such a way that the former and the latter are respectively in pairs, with two light projectors, as well as each two light receptors, spaced apart in corresponding relation to the working space S to be provided in front of each movable rack 2 and each stationary rack 1, the distance between each pair of light projectors 65, as well that between each pair of light receptors 66, being set at a distance W that is equal to the width of the working space S. The light projectors 65 and light receptors 66 are respectively connected to corresponding control devices 49.

The manner of operation of the rack arrangement of the above described construction will be explained below.

Figure 13:
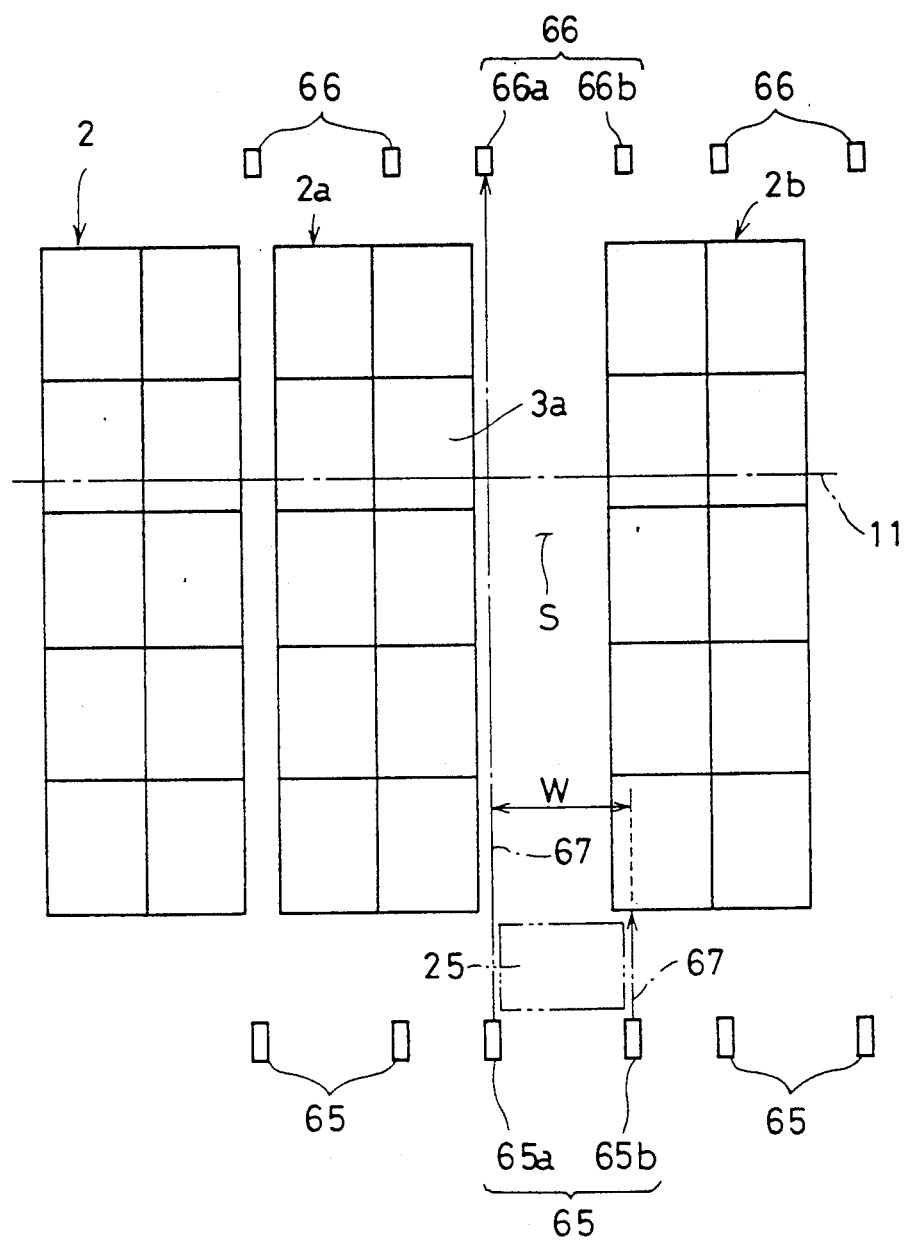
FIGS. 13 to 15 are views for explaining the operation of the rack arrangement shown in FIG. 11.

During inward and outward transfer operation with respect to load 31, when a working space S is to be provided in front of the facade of a movable rack 2a having a target partitioned storage space 3a as shown in FIG. 13, a pair each only of light projectors 65a, 65b, front and rear, and light receptors 66a, 66b, front and rear, which correspond to the movable rack 2a operate under the control of control device 49. In the event that, because of failure of motor 10 of the movable rack 2a, failure of motor 10 of another movable rack 2b located on the frontwardly opposite side, or some control error, the working space S provided in front of the partitioned storage space 3a should be smaller than the predetermined width for the working space S, the side of the one movable rack 2a or the side of the other movable rack 2b intercepts the light 67 projected from light projectors 65a, 65b, and accordingly the fact that the working space S falls short of the predetermined width requirement can be detected. In this case, a detection signal is input to the centralized control system 52 via control device 49 and, in turn, the centralized control system 52 stops movement of the transfer unit 25. Thus, the transfer unit 25 is prevented from colliding against the side of the one movable rack 2a or the other movable rack 2b.

Figure 14:
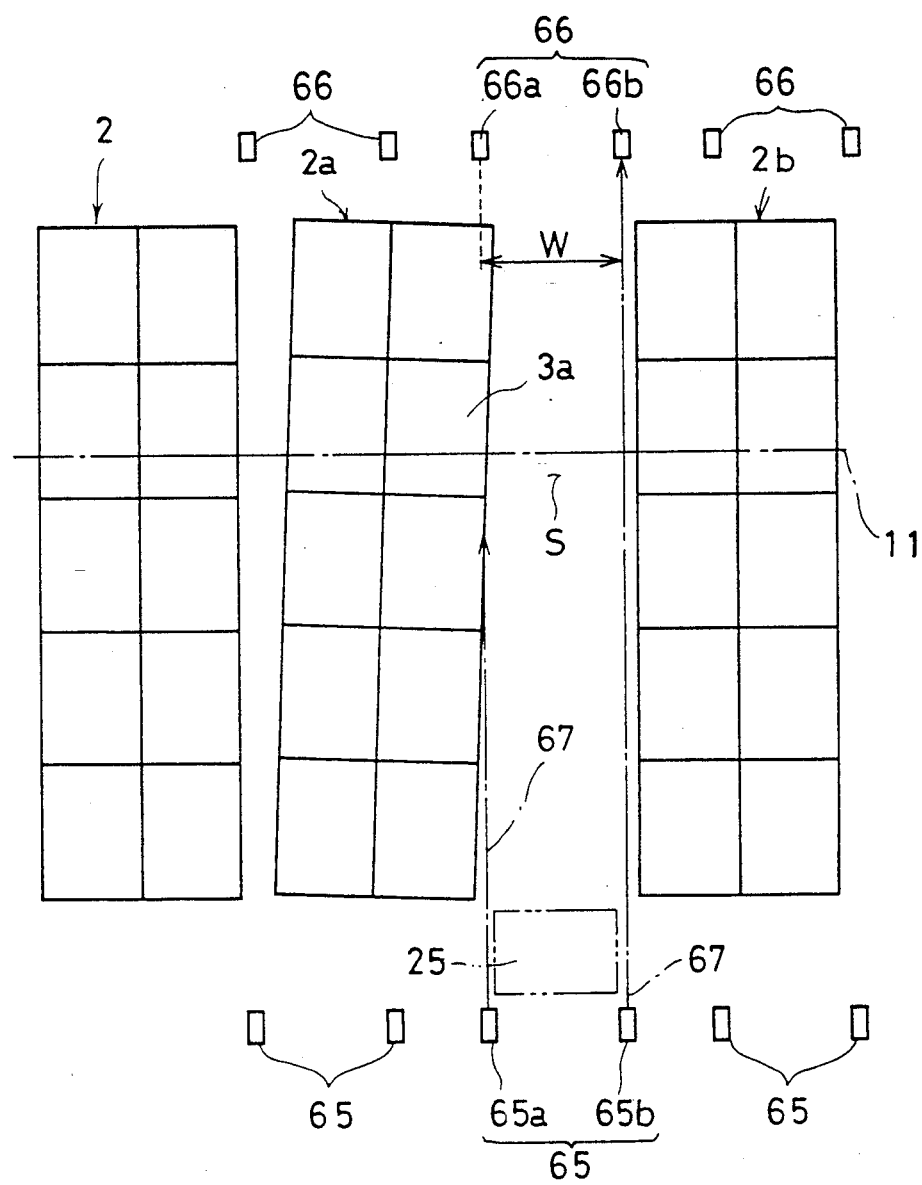

When the one movable rack 2a or the other movable rack 2b is relatively offset forwardly or rearwardly as shown in FIG. 14, the front edge of the one movable rack 2a or the front edge of the other movable rack 2b intercepts the light 67 projected from light projectors 65a, 65b, and accordingly the presence of such positional deviation with respect to the movable racks 2a, 2b can be detected. In such case, movement of the transfer unit 25 is stopped, whereby the transfer unit 25 can be prevented from collision with the front of the one or the other movable rack 2a, 2b.

Figure 15:
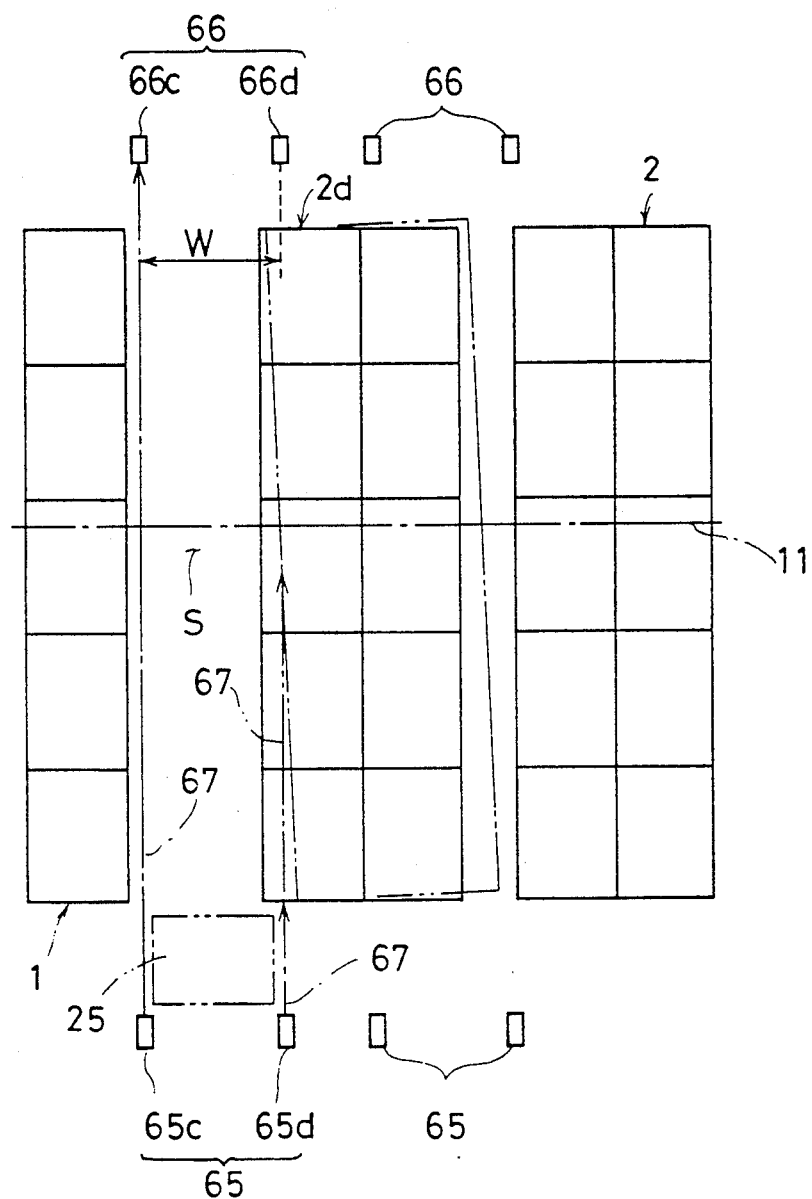

Similarly, when a working space S is to be provided in front of, for example, the facade of the rear side of stationary rack 1 as shown in FIG. 15, light projectors 65c, 65d and light receptors 66c, 66d only operate, and if it is detected that the width of the working space S is smaller than the predetermined width W, and/or that the movable rack 2d located on the frontwardly opposite side is relatively offset as shown in phantom, movement of the transfer unit 25 is stopped.

In the present embodiment, the load handling area 15 is provided externally of one end of the longitudinally extending racks 1, 2, but similarly to the case of the FIG. 8 embodiment, load handling areas 15 may be provided externally of both ends of the racks 1, 2.

According to the arrangement of the present embodiment, the width of a working space S provided in front of a target partitioned storage space 3 is detected by the width detecting device comprising light projectors 65 and light receptors 66; therefore, it is possible to detect that the width of the working space S falls short of the predetermined width requirement, if such shortage is present. In that case, movement of the transfer unit 25 is stopped, whereby the transfer unit 25 is prevented from collision with movable racks 2.

Figure 16:
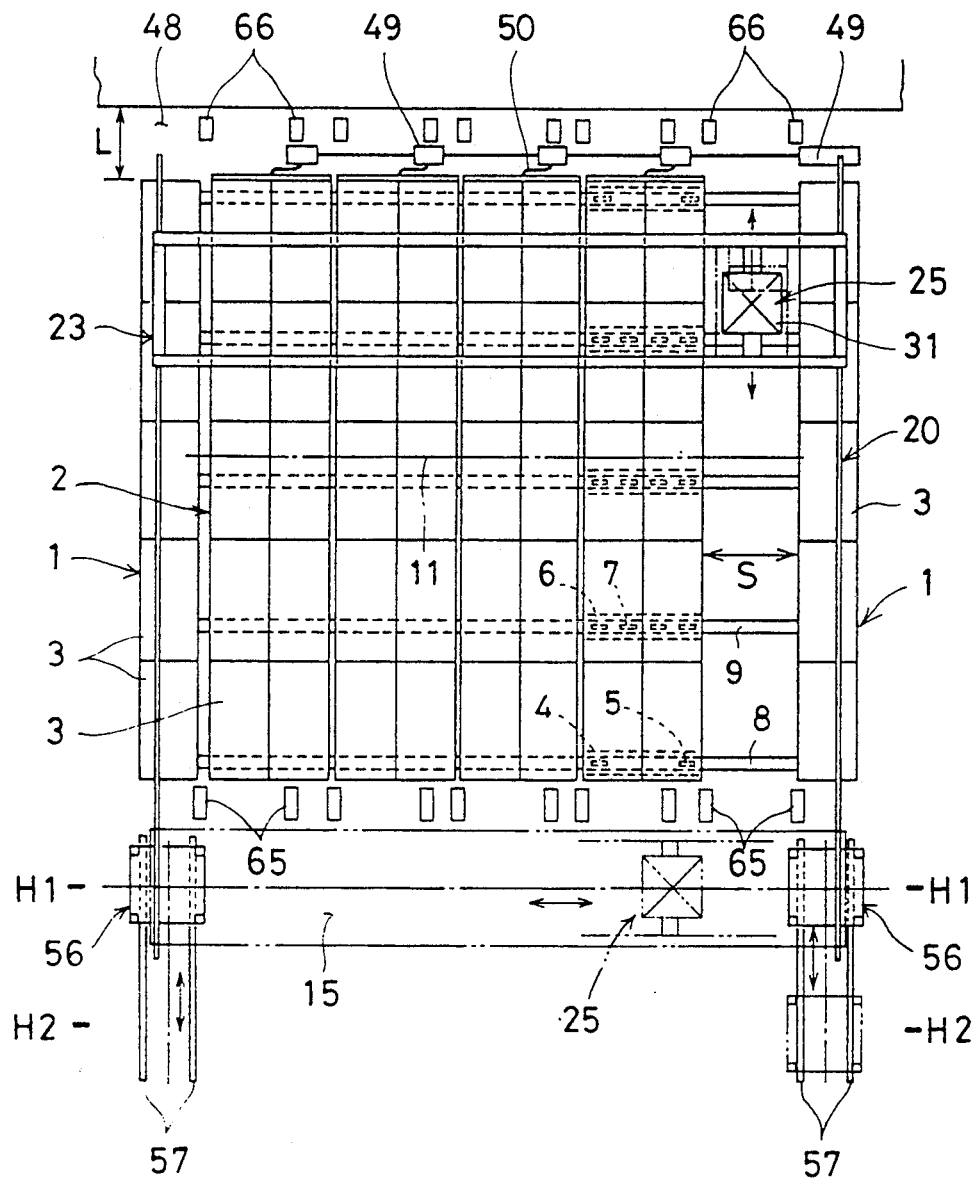
FIG. 16 is a plan view of a rack arrangement representing another embodiment of the invention.

FIG. 16 shows still another embodiment of the invention. In this embodiment, as is the case with the FIG. 6 embodiment, load holder blocks 56 which are reciprocatively movable in a direction perpendicular to the predetermined track 11 are provided at opposite ends of the load handling area 15.

Figure 17:
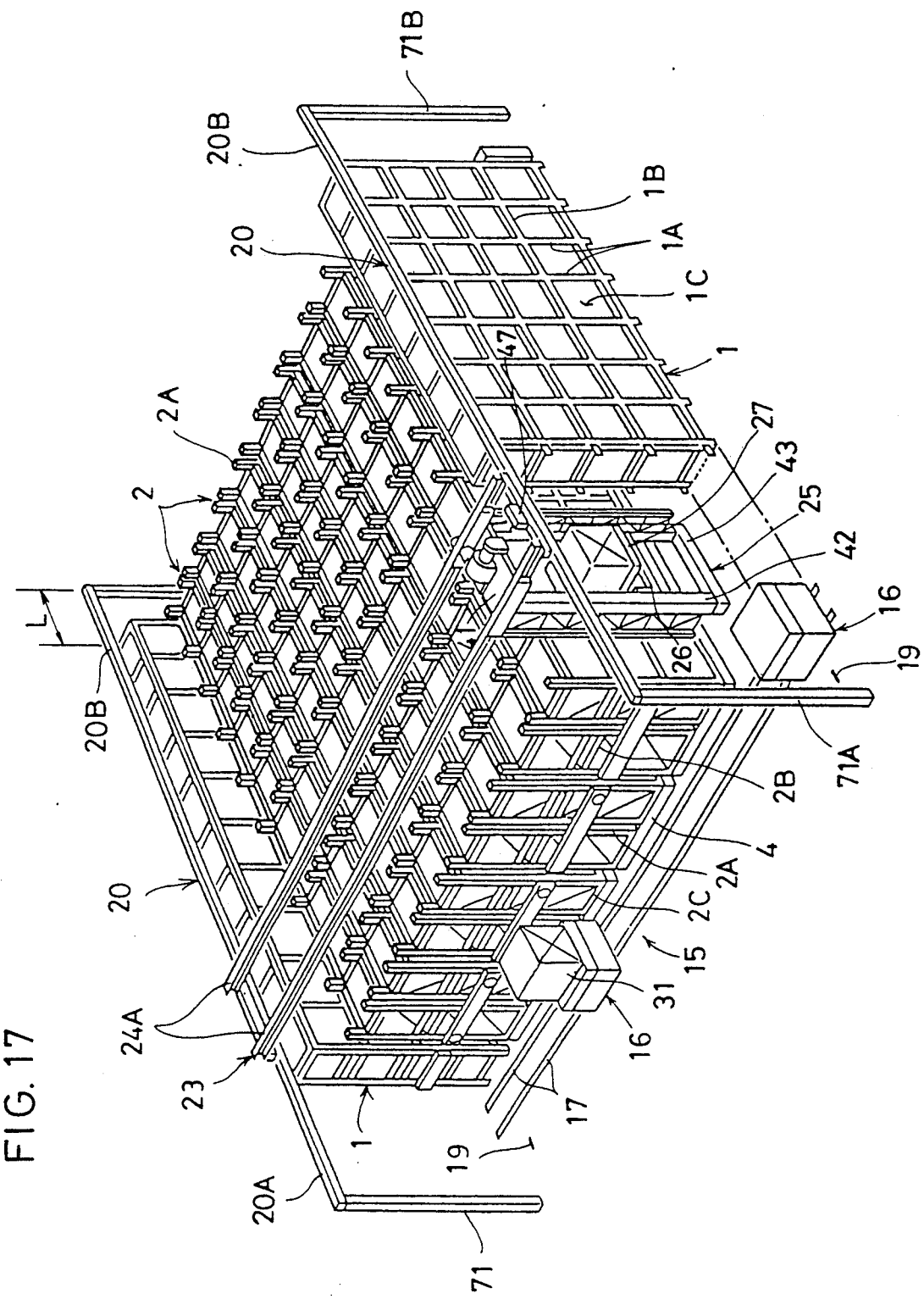
FIG. 17 is a perspective view of a rack arrangement representing a further embodiment of the invention.
Figure 18:
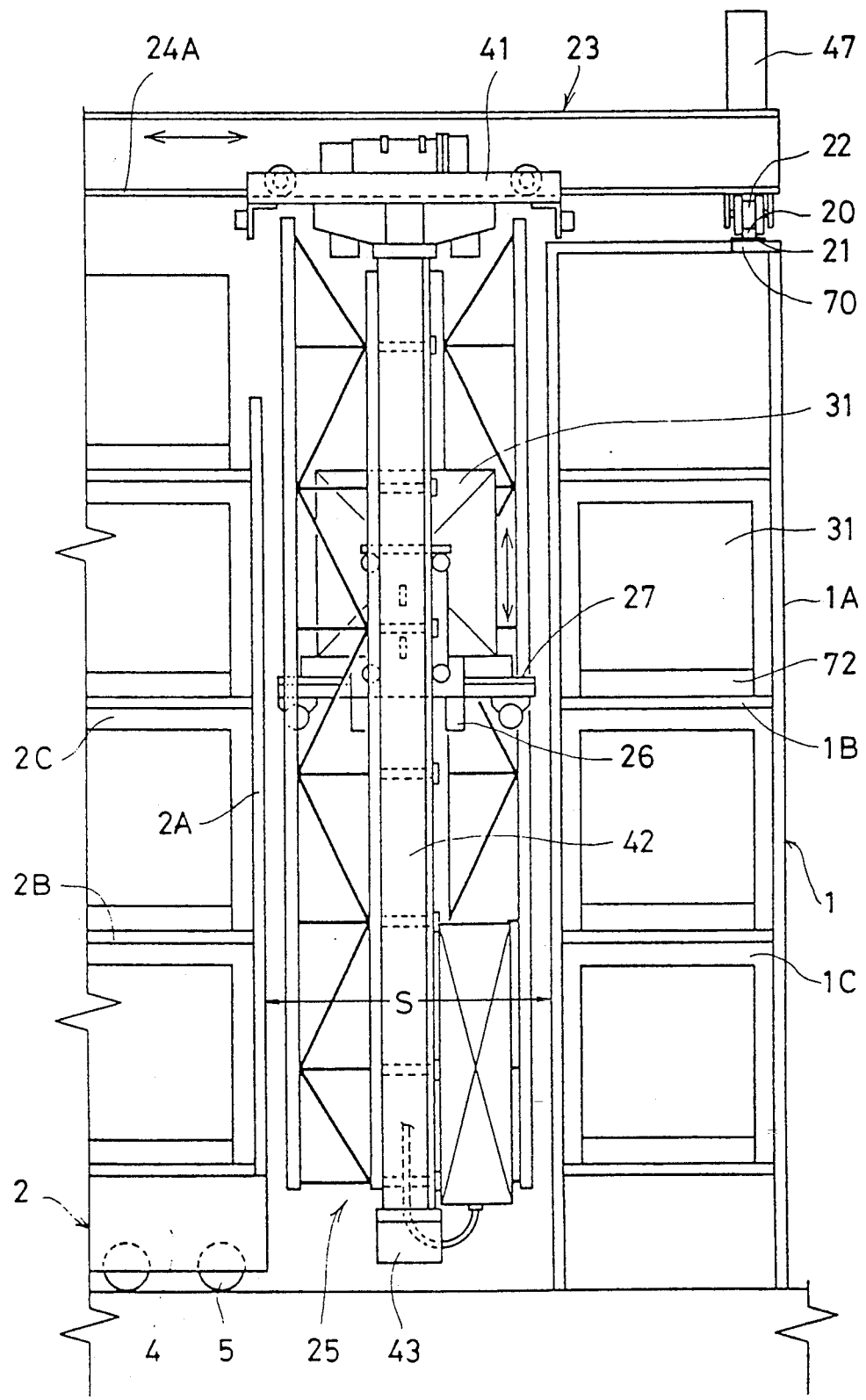
FIG. 18 is a fragmentary side view of the rack arrangement shown in FIG. 17.
Figure 19:
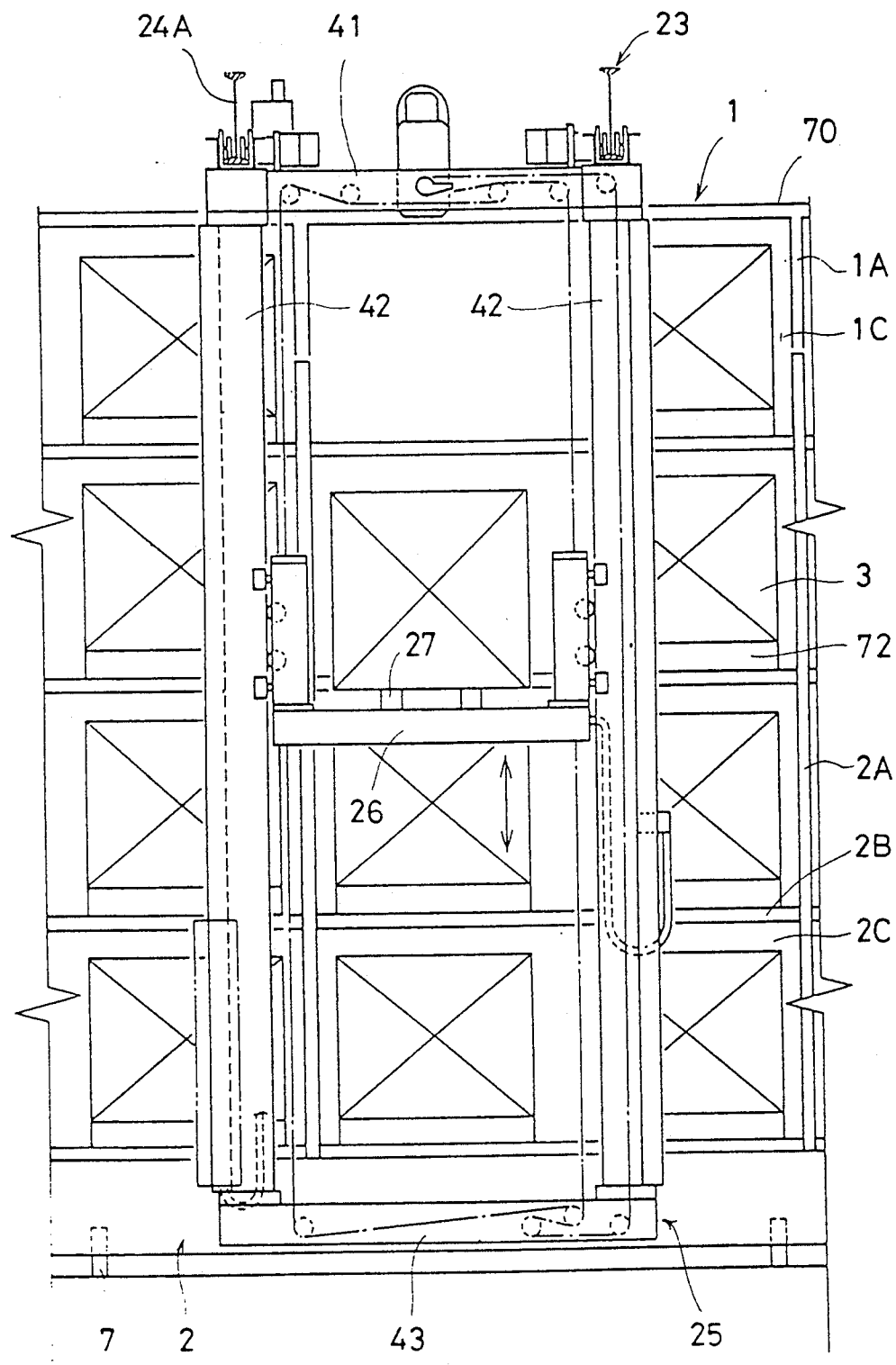
FIG. 19 is a fragmentary front view of the rack arrangement shown in FIG. 17.

FIGS. 17 to 19 show a further embodiment of the invention. In this embodiment, stationary and movable racks 1, 2, each comprise support posts 1A, 2A and load bearing members 1B, 2B, and a plurality of vertically and laterally partitioned storage spaces 1C, 2C defined by these support posts 1A, 2A and load bearing members 1B, 2B.

Support posts 1A of stationary rack 1 are designed to be of a length sufficient to define a whole uppermost storage space 1C, so that loads stored in the uppermost partitioned storage space 1C are entirely surrounded. Support posts 1A are interconnected at the upper ends thereof by laterally extending connecting members 70. Support posts 2A of each movable rack 2 are of such configuration that they project up to a median level (or a height corresponding to the thickness of a pallet, for example) within the uppermost storage space 2C, so that an upper portion of load 31 stored in the uppermost partitioned storage space 2C is exposed.

Crane rails 20 are each mounted on one of the stationary racks 1 by being fixed through fixing members 21 between upper ends of the support posts 1A positioned outermost. One end portion 20A of each crane rail 20, as viewed in a longitudinal direction thereof, extends to a location above the load handling area 15 and is supported on the floor by an auxiliary support post 71A. The other end portion 20B of each crane rail 20 extends beyond the other end of the corresponding stationary rack 1 by a predetermined distance L and is supported on the ground by an auxiliary support post 71B.

According to such arrangement, when loads 31 are stored into individual storage spaces 1C, 2C of stationary and movable racks 1, 2, loads 31 stored into the uppermost storage space 1C of each stationary rack 1 are wholly surrounded by support posts 1A and connecting members 70. Loads 31 stored into the uppermost storage space 2C of each movable rack 2 are almost wholly exposed while they are prevented from falling down by their pallets 72 being positioned in opposed relation to the projecting portions of support posts 2A.

In this way, according to the arrangement of the present embodiment, it is possible to install crane rails 20 directly on the stationary racks 1 only by using fixing members 21 of simple construction, while the load on the girder 23 side which is supported between the crane rails 20 can be rigidly supported on the floor by utilizing the two stationary racks 1 as support structures. Therefore, the crane rails 20 can be firmly installed without need for any special support structure. Thus, it is possible to compactly arrange the girder 23 at a level above the movable racks 2 and thereby to improve the storage efficiency of the movable racks 2.

The uppermost storage space 2C of each movable rack 2 can be defined in such condition that support posts 2A therefor are partially cut away. Therefore, it is possible to provide movable racks 2 which are constructed from a smaller number of component materials and are less expensive. Further, loads 31 stored in the uppermost storage space of each movable rack 2 are well protected against possible falling off because the loads 3 are so positioned that their underside is held in opposed relation to the projecting portions of support posts 2A.

Figure 20:
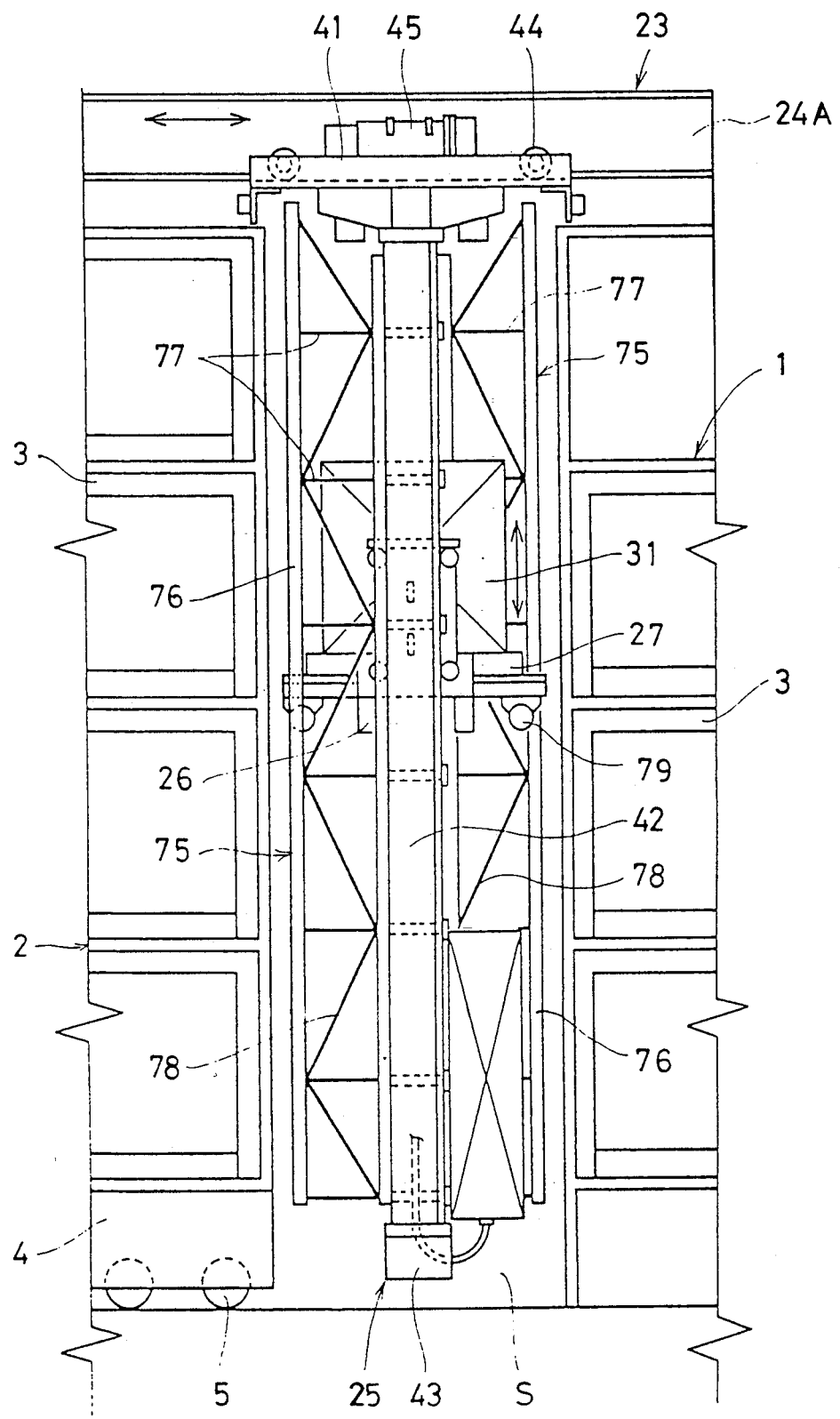
FIG. 20 is a fragmentary side view showing a rack arrangement in another embodiment of the invention.
Figure 21:
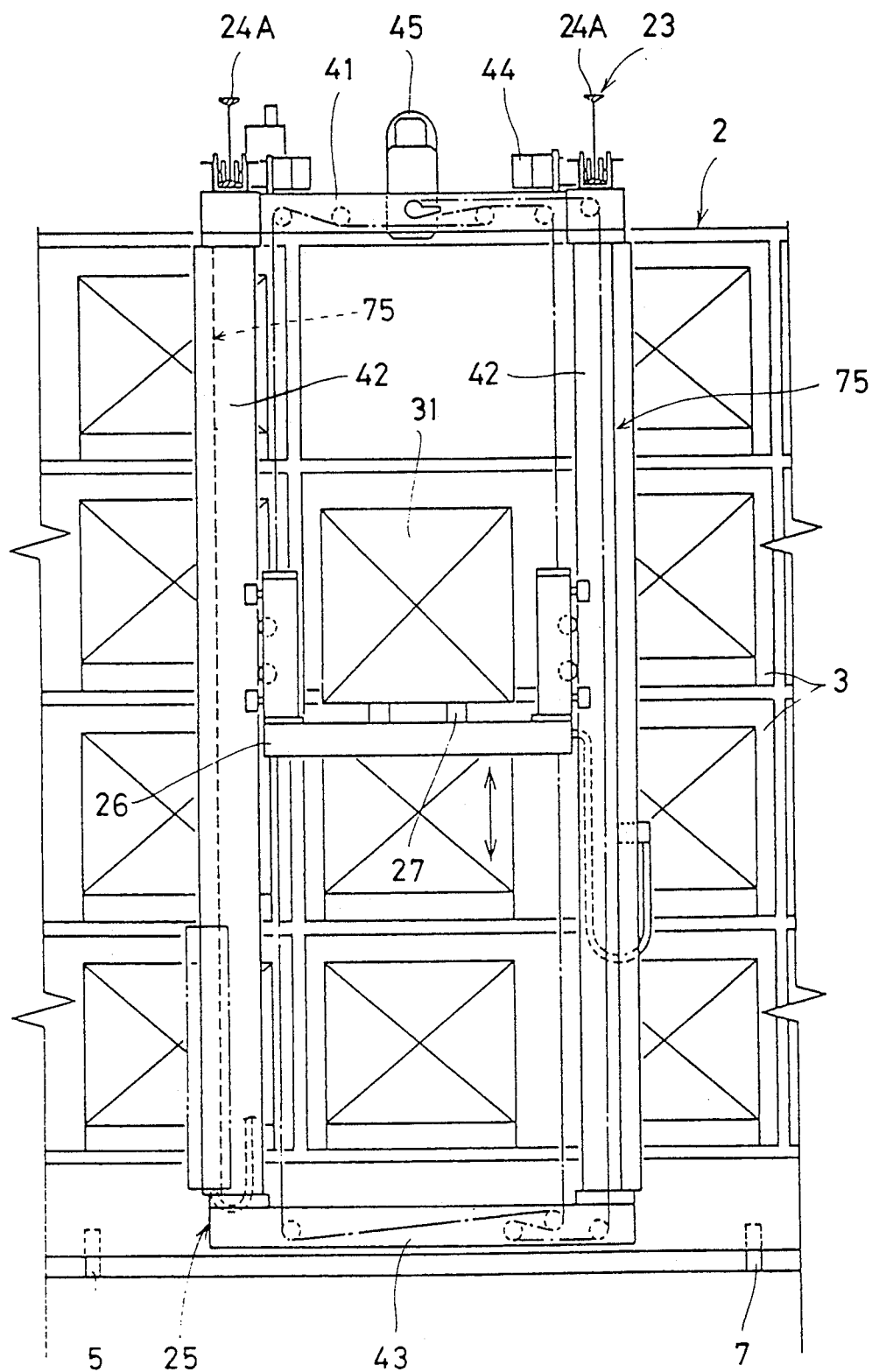
FIG. 21 is a fragmentary front view of the rack arrangement shown in FIG. 20.
Figure 22:
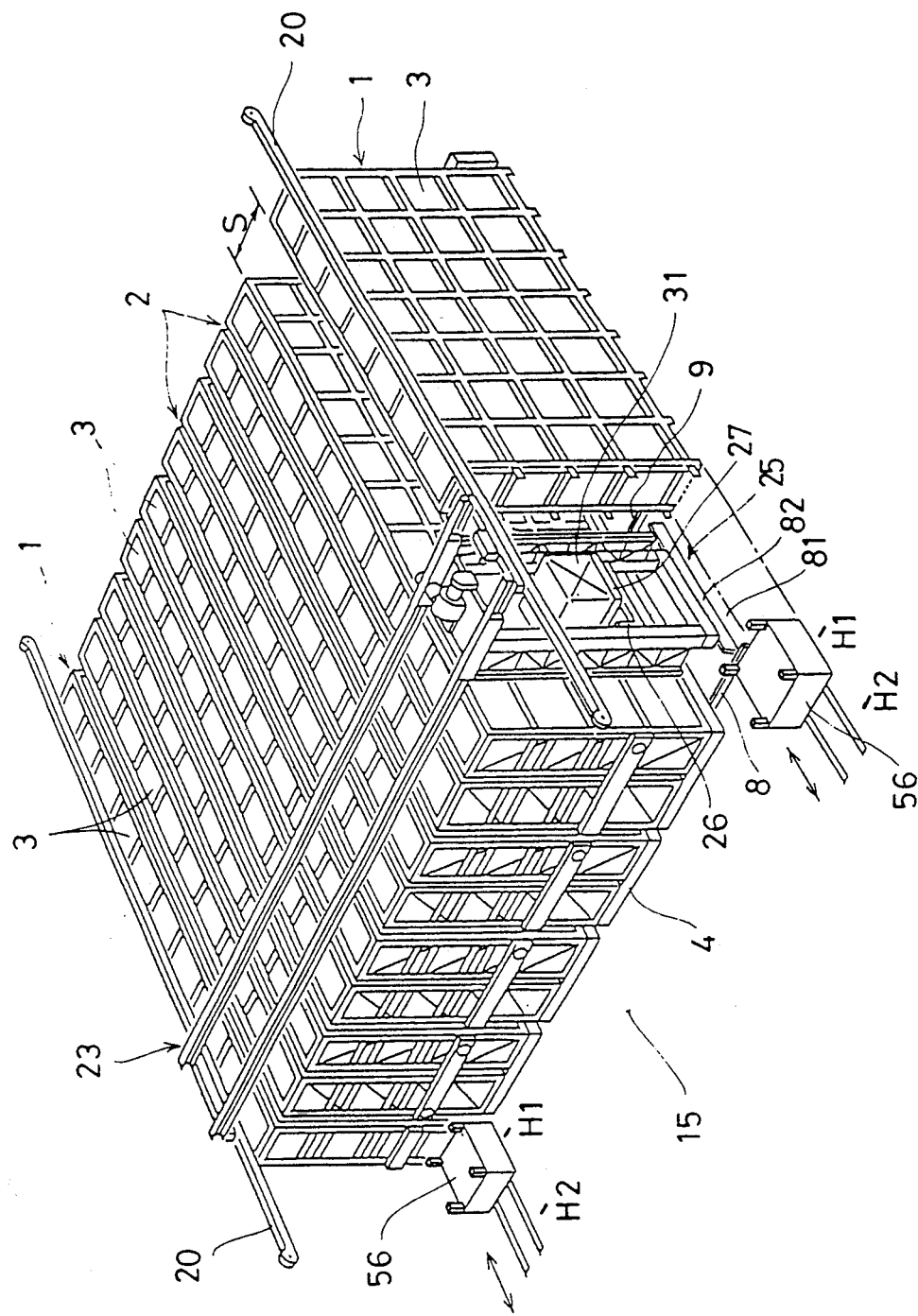
FIG. 22 is a perspective view showing a rack arrangement in still another embodiment of the invention.
Figure 23:
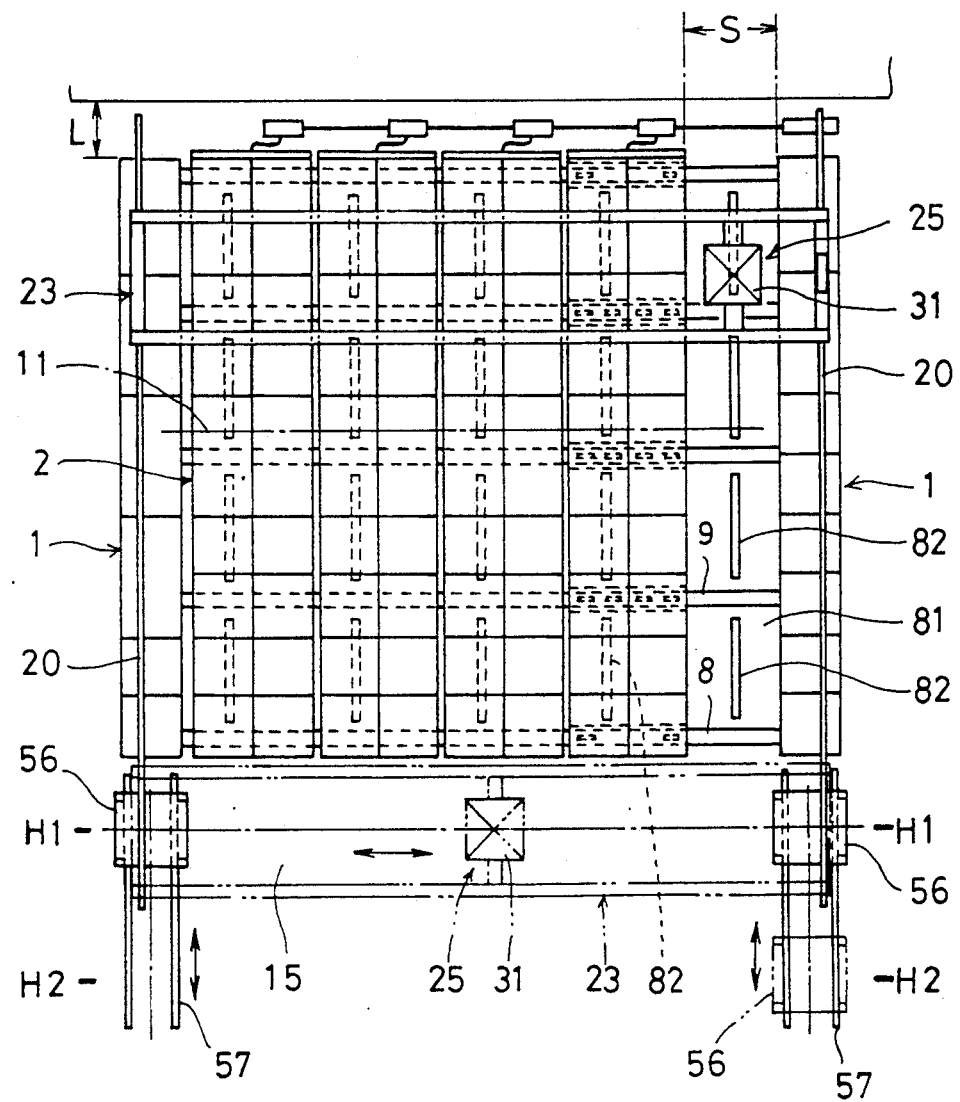
FIG. 23 is a plan view of the rack arrangement shown in FIG. 22.

FIGS. 20 and 21 show another embodiment of the invention.

The transfer unit 25 has vertical frames 75 arranged under an upper frame 41 and about sides of posts 42. Vertical frames 75 are arranged at opposite sides of the transfer unit 25 in such a way that one vertical frame 75 is disposed at the front side relative to one post 42 and another vertical frame 75 is disposed at the rear side relative to the other post 42. Each vertical frame 75 comprises a longitudinal member 76 depending from the front side or rear side end of the upper frame 41, a plurality of upper and lower lateral members 77 connecting between the longitudinal member 77 and posts 42, and oblique members 78 obliquely extending between adjacent lateral members 77 to interconnect the longitudinal member 76 and posts 42, the vertical frame 75 being thicknesswise oriented in a longitudinal direction of the rack arrangement. Constructed as such, each vertical frame 75 reinforces the corresponding depending post and its component lateral members 77 serve as a ladder. Shown at 79 is a drive gear for driving the take-in/take-out device 27 to extend and retract relative to the carriage 26.

According to such arrangement, when the transfer unit 25 tends to sway during its operation, and more particularly during its movement within the load handling area 15 (provided outside the working space S) in a direction perpendicular to a longitudinal direction of the racks 1, 2, such sway movement of the transfer unit 25 can be prevented because of the reinforcing effect of the vertical frame 75. Although the transfer unit 25 is designed for inward and outward delivery of load 31 through crane-type operation, therefore, the arrangement of the present embodiment provides for quick and safe delivery of load 31 between the transfer unit and the other device at all times. The transfer unit 25 has long and good serviceability. The lateral members 77 of the vertical frames 75 may be used as grips, footholds, or a ladder for the operator when maintenance and inspection are required with respect to various drive gears arranged on the top of the transfer unit 25, such as the run drive gear and the up-and-down motion drive gear, and this provides ease of maintenance and inspection.

In this embodiment, vertical frames 75 are apportioned between the front side and the rear side, in a manner such that one vertical frame is used at the front side of one post 42 and another is used at the rear side of the other post. However, it may be arranged that such vertical frame is used with respect to one post only. In another alternative, vertical frames 75 may be arranged at the front and rear sides of the both posts 42, that is a total of four vertical frames may be used.

In the foregoing embodiments, a movable rack arrangement is shown as the rack arrangement of the invention. Alternatively, the rack arrangement may be an automatic warehousing rack arrangement. That is, automatic warehousing racks of such arrangement that a working space S is centrally provided between a pair of stationary racks may be arranged in plurality so that a transfer unit may be back and force movable within a space defined between each adjacent pair of such rack arrangements.

FIGS. 22 to 25 show a further embodiment of the invention. In this embodiment, longitudinally extending guide rails 82 are arranged on those portions of the floor in which a working space S is to be defined, the guide rails 82 being cut away at portions corresponding to rails 8, 9 in order to prevent possible interference.

Figure 24:
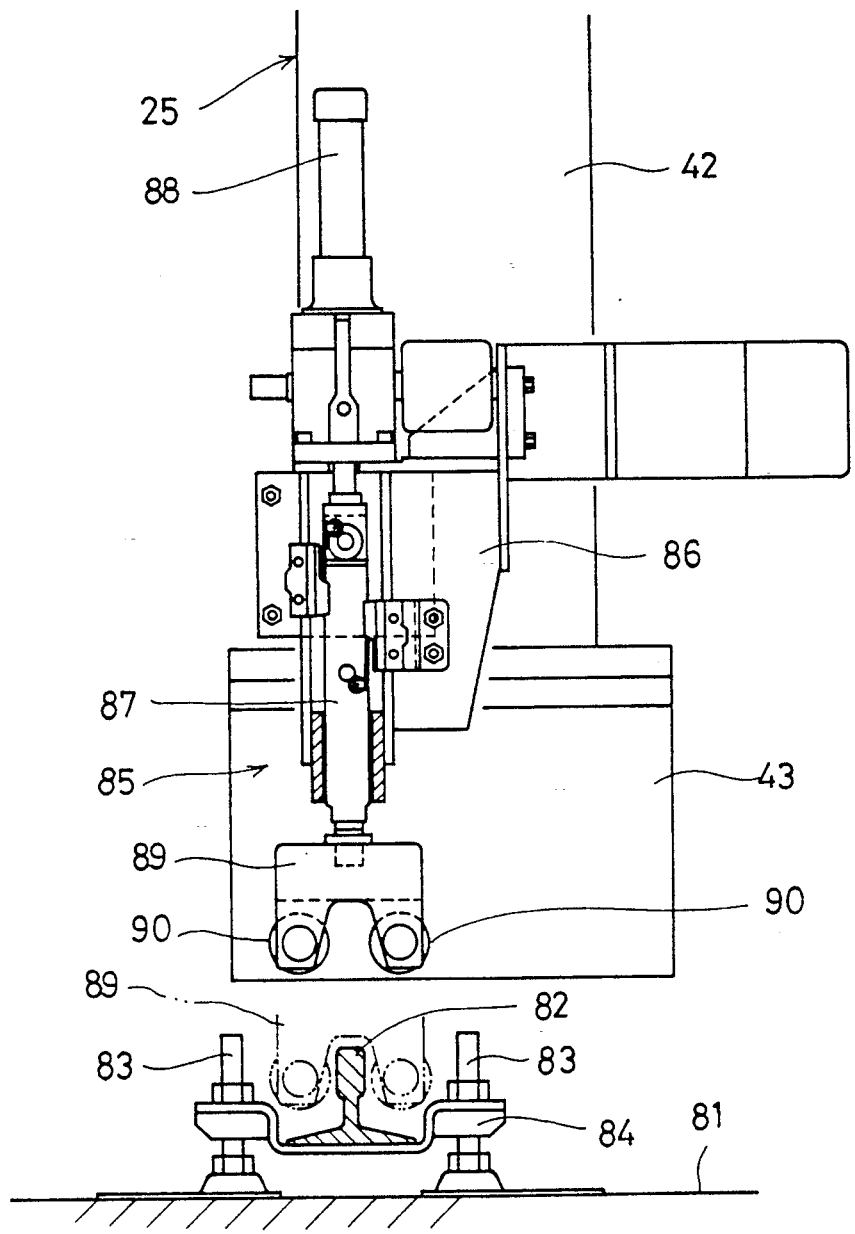
FIG. 24 is a fragmentary detail view in side elevation showing the rack arrangement in FIG. 22.
Figure 25:
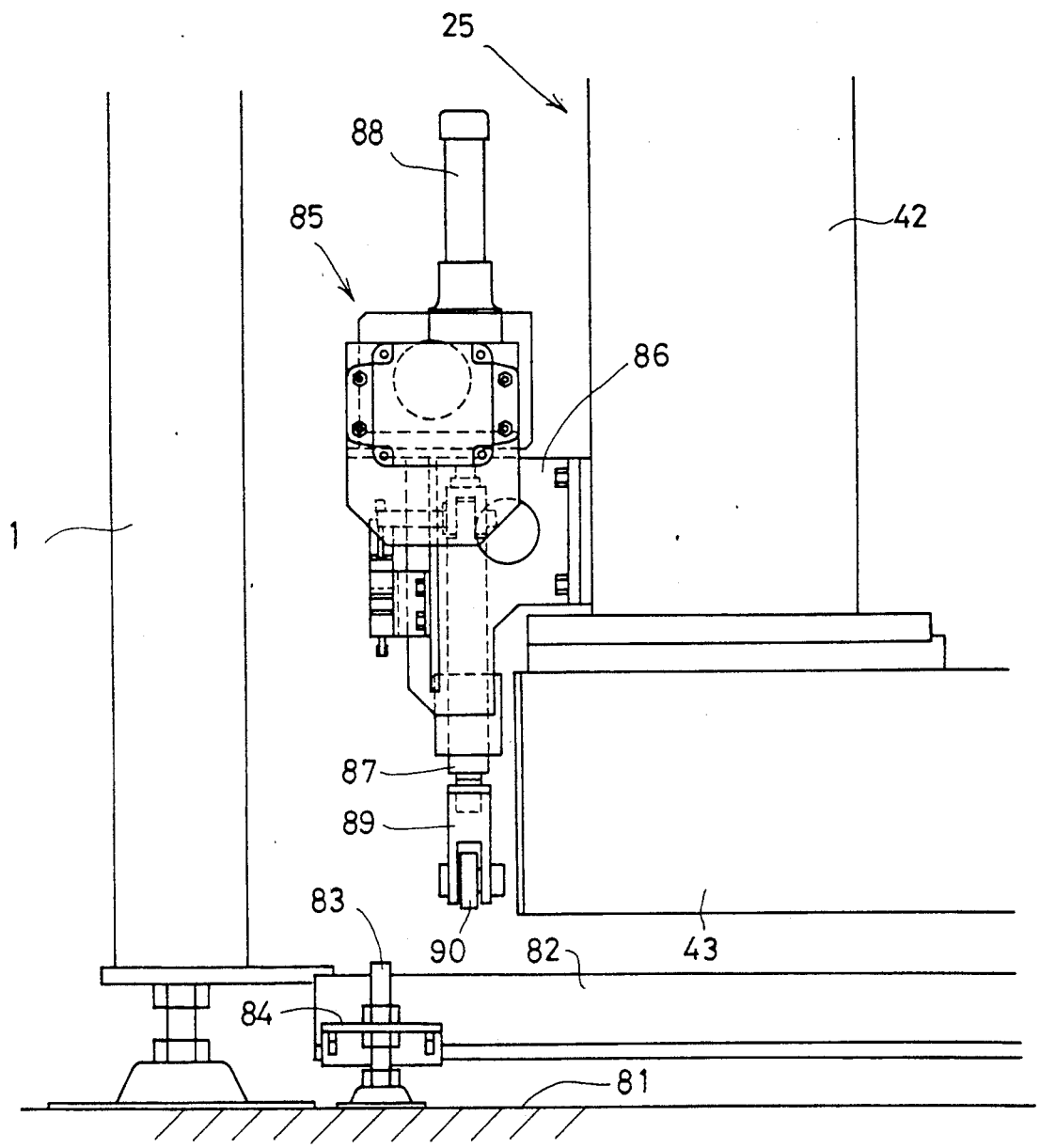
FIG. 25 is a detail view in front elevation of the portion shown in FIG. 24.

As shown in detail in FIGS. 24 and 25, each guide rail 82 is supported by a bracket 84 having height adjust screws 83. A positioning device 85 is provided at the lower end of a post 84 in the neighborhood of a lower frame 43 of the transfer unit 25 which is suspendedly supported by the girder 23. The positioning device 85 has a bracket 86 attached to the lower end of the post 42, and to the bracket 86 is mounted a vertical cylinder device 88 having a downwardly extending operating rod 87. The operating rod 87 is provided at its front end with a U-shaped holder 89 which is capable of holding the guide rail 82 at both sides when the operating rod 87 is extended. The holder 89 is provided at its distal end with rollers 90 intended to facilitate the holding action of the holder 89.

According to such arrangement, for inward and outward delivery of load 31, the girder 23 and transfer unit 25 are driven into movement so that the carriage 26 of the transfer unit 25 is positioned opposite to a target storage space 3, in the same way as in the case of the foregoing embodiments. Then, the take-in/take-out device 27 is driven to extend and retract for delivery of load 31 to and from the storage space 3. In this case, the operating rod 87 of the cylinder device 88 is extended for gripping the guide rail 82 by means of the holder 89, whereupon the underside of the suspendedly supported transfer unit 25 is anchored so that the transfer unit 25 is sway-stopped and load entry and discharge may be thus stably performed.

FIGS. 26 to 29 show another embodiment of the invention. In this embodiment, the transfer unit 25 includes a retractably back and forth movable multiple fork 91 as its take-in/take-out device.

Figure 26:
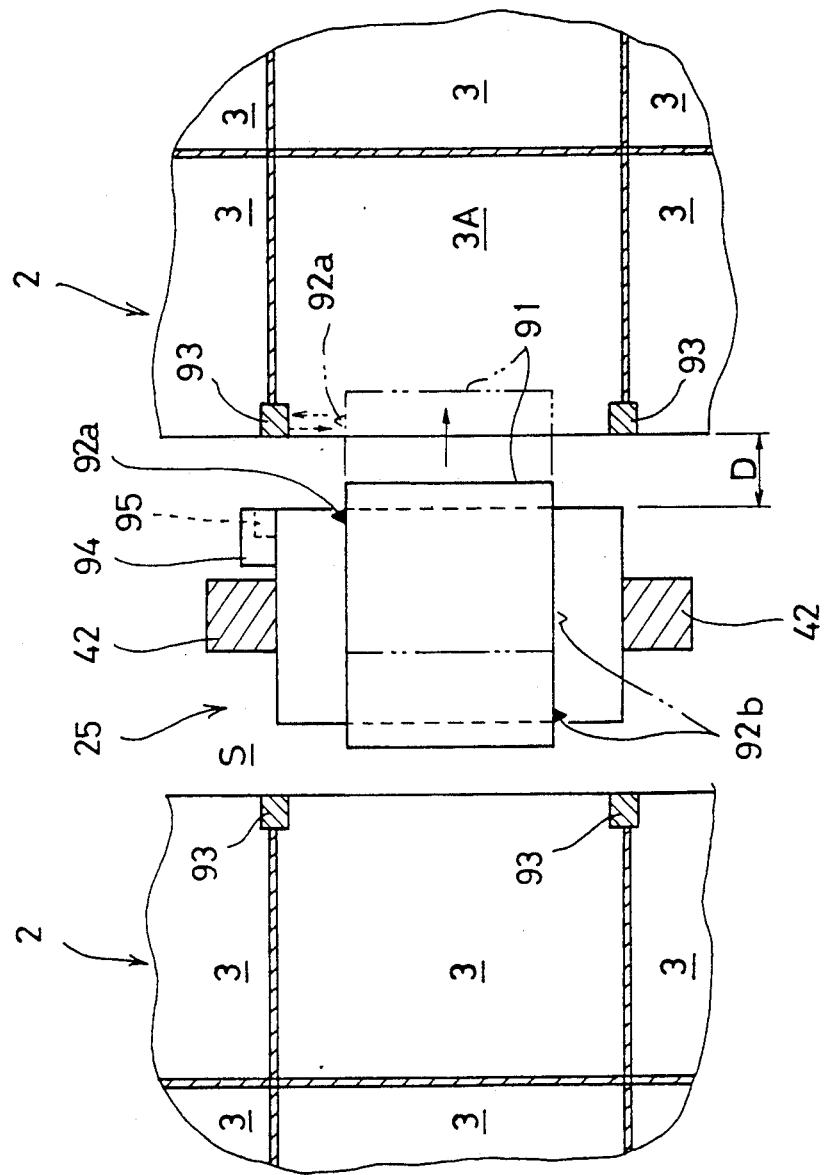
FIG. 26 is a fragmentary plan view showing a rack arrangement in another embodiment of the invention.

As FIG. 26 shows, the multiple fork 91 which is of the vertically multiple type is provided with reflection-type photoelectric switches 92a, 92b, which are shown by way of example as rack detecting devices, on the sides of its uppermost stage prong, at the front end of one side and at the rear end of the other side respectively. Longitudinal support posts 93 which, as components of each rack 1, 2, define individual storage spaces are used, for example, as detectable elements. Further, it is noted that a switch device (not shown) is provided which actuates one photoelectric switch 92a only when the fork 91 at the front position is to be extended and retracted and which actuates the other photoelectric switch 92b only when the fork 91 at the rear position is to be extended and retracted, as shown in phantom in FIG. 26.

The transfer unit 25 is provided with a control device 94 for controlling the extending and retracting action of the fork 91. The control device 94 has a counter 95 for detecting the projection stroke of the fork 91 such that the projection of the fork 91 is stopped when counting by the counter 95 has reached a predetermined value. The operation of the rack arrangement of the present embodiment will be explained below.

For inward delivery of load 31, the girder 23 is caused to run and the transfer unit 25 is moved in a longitudinal direction within the working space S in the same manner as in the case of the foregoing embodiments. After the transfer unit 25 is stopped, the carriage 26 is moved upward and downward so that the fork 91 is positioned opposite to a target storage space 3. Then, the fork 91 is projected into the target storage space 3 and thereafter the carriage 26 is lowered, whereby the load 31 on the fork 91 is unloaded into the target storage space 3 through a pallet 72. Subsequently, the fork 91 is retracted from the target storage space 3 into the transfer unit 25.

For outward delivery of load 31, empty transfer unit 25 is moved within the working space S in a longitudinal direction and then stopped, whereafter the carriage 26 is moved upward and downward so that the fork 91 is positioned opposite to the target storage space 3. Then, the fork 91 is projected for entry into the target storage space 3, and thereafter the carriage 26 is elevated, so that load 31 is picked up by the fork 31 through the pallet 72. Then it is possible to take out the load 3 from the storage space 3 by retracting the fork 91 from the target storage space 3 into the transfer unit 25.

Figure 28:
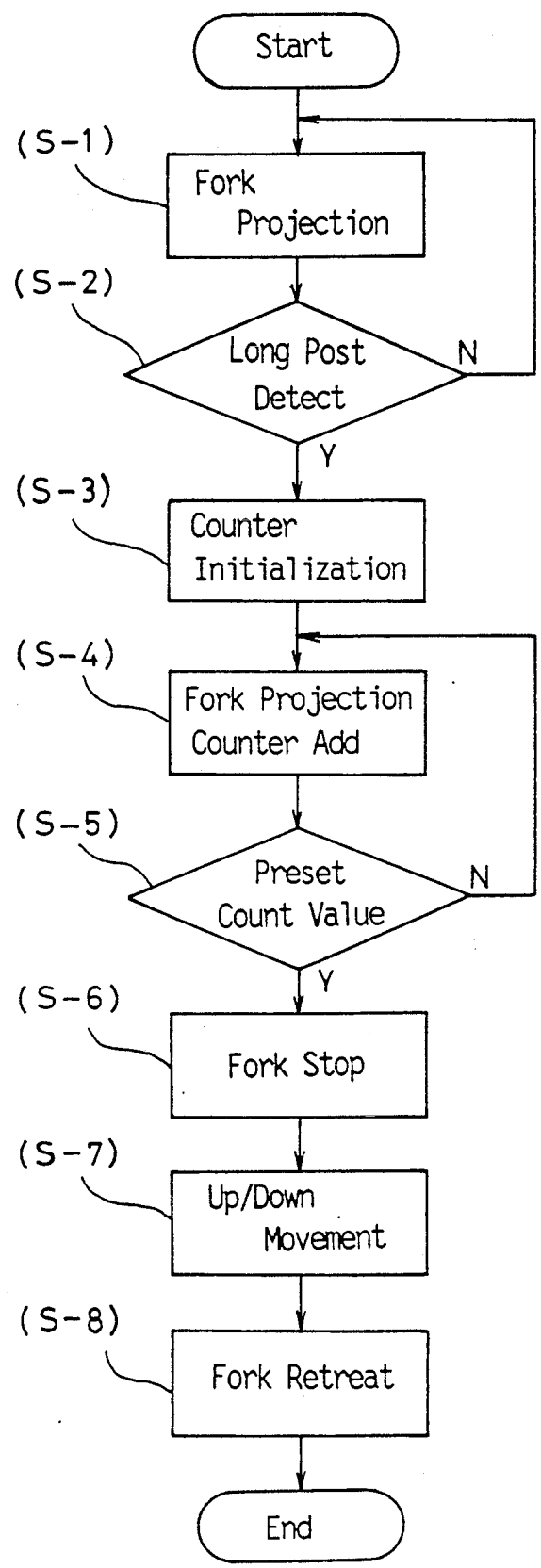
FIG. 28 is a flow chart showing the sequence of operation of the rack arrangement in FIG. 26.

Operation for control of the fork 91 by the control device 94 during the process of the above the described inward and outward delivery of load 31 will now be explained with reference to the flow chart given in FIG. 28.

When the target storage space 3A is located in front of the transfer unit 25, the fork 91 is extended forward as shown in phantom in FIG. 26 (S-1). Then, whether or not the one photoelectric switch 92a has detected the front support post 93 of the target storage space 3A is determined. If not, the fork 91 continues to be projected forward until detection is made (S-2) When the front support post 93 is detected, the counter 95 is initialized to zero (S-3). While the fork 91 is further caused to project forward, the stroke of projection of the fork 91 is counted by the counter 95 (S-4). Whether or not the counter 95 has reached the predetermined count value is determined. If not, the fork 91 is caused to continue to project forward (S-5).

When the counter 95 has reached the predetermined count value, the fork 91 is caused to stop projection (S-6). Thus, the fork 91 stops at a position located inward by the predetermined stroke T into the storage space 3A from the position P at which the front longitudinal support post 93 is detected from position. Then, for outward delivery, the carriage 26 is moved upward to cause the fork 91 to pick up the load 31, while for inward delivery, the carriage 26 is moved downward to unload the load 31 on the fork 91 into the storage space 3A (S-7). Subsequently, the fork 91 is caused to retreat from the storage space 3A for return to its position on the carriage 26 (S-8).

Figure 29:
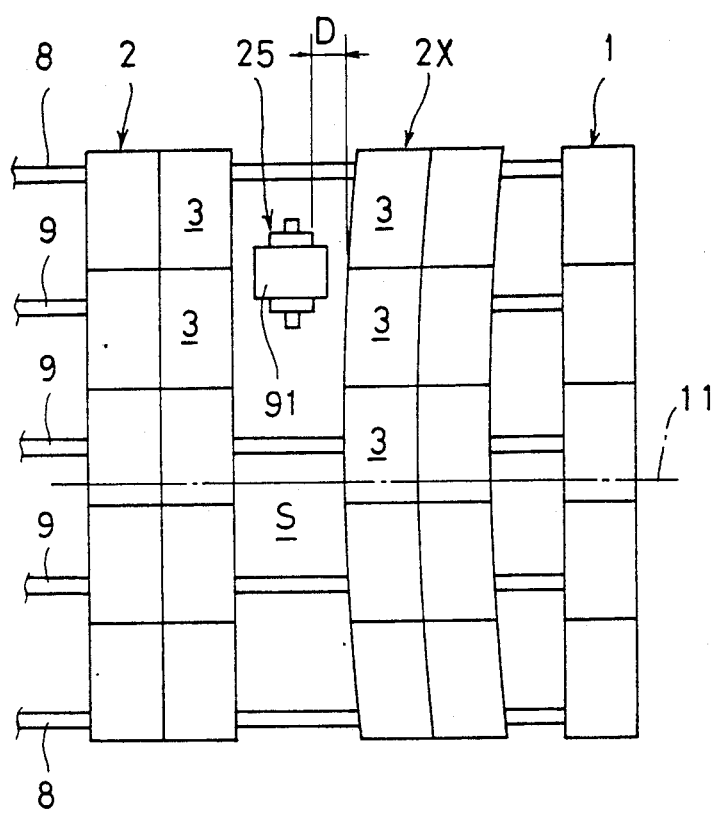
FIG. 29 is a plan view for explaining the operation of the rack arrangement in FIG. 26.

Even when the target movable rack 2X is stopped in such condition that it is forwardly or rearwardly deflected at opposite ends, with the result that the distance D between the transfer unit 25 and the target storage space 3 is larger or smaller than the predetermined value, as shown in FIG. 29, the fork 91 positively projects into the storage space 3 by the predetermined stroke T from the position P at which the front longitudinal support post 93 is detected. Therefore, the amount of projection of the fork 91 into the storage space 3 can be always kept constant. Accordingly, the load 31 in the partitioned storage space 3 may be properly lifted or load 31 can be properly placed into the partitioned storage space 3, as the case may be.

Figure 27:
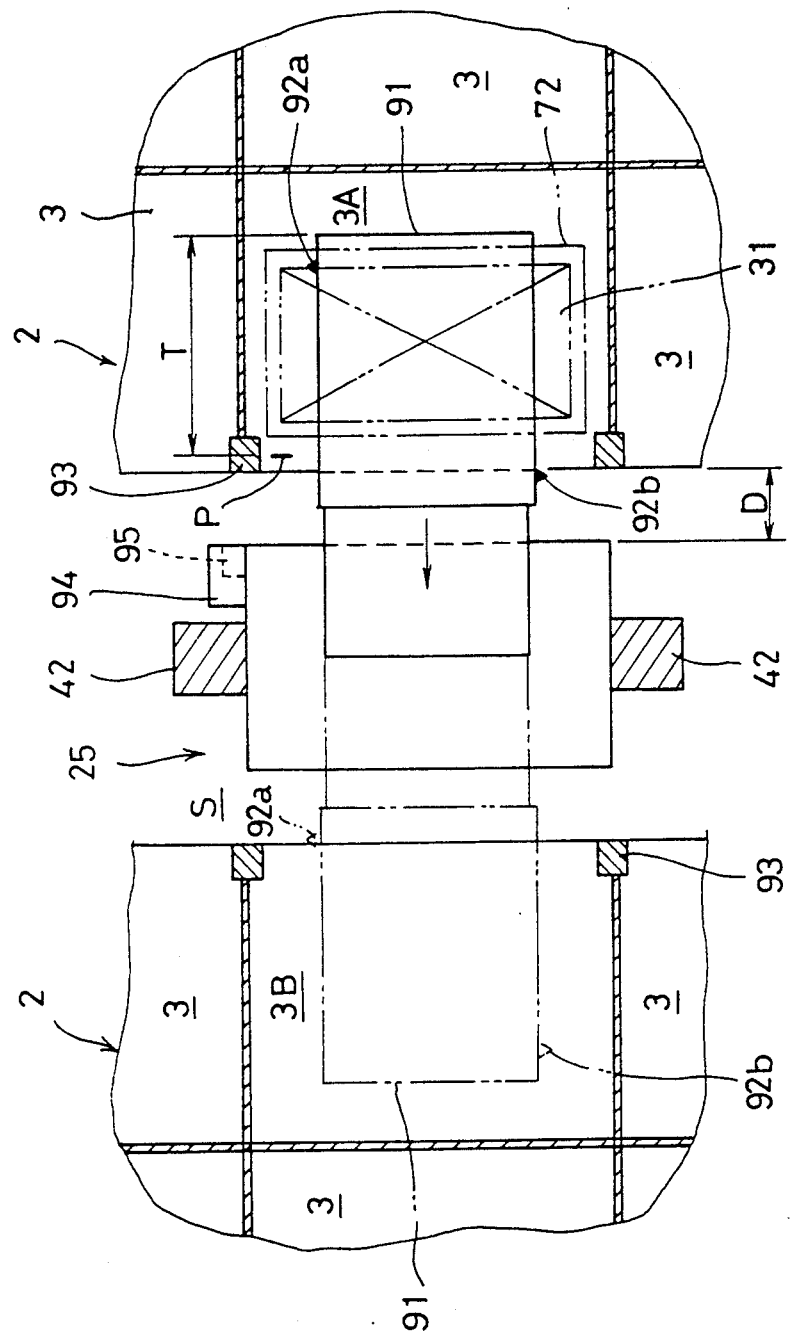
FIG. 27 is a fragmentary plan view showing the rack arrangement of FIG. 26 in operation.

Similarly, when the target storage space 3B is located behind the transfer unit 25 as shown in FIG. 27, the fork 91 is projected rearward and the front longitudinal support post 93 of the storage space 3B is detected by the other photoelectric switch 92b, so that the fork 91 is projected into the storage space 3B. For entry of the load into or discharge of the load from a storage space of stationary rack 1, the operation is carried out in similar manner.

The counter 95 detects, for example, the time period of the projecting operation of the fork 91, or the projecting stroke of the fork 91 based on the unit number of resolutions of a motor (not shown) which drives the fork 91.

In the foregoing embodiments, the rack arrangement is of the type in which stationary racks 1 and movable racks 2 are arranged, but the arrangement may be of such a type that all racks are movable racks 2, with a space S defined between an outermost movable rack 2 and some other object, such as a wall.

In the foregoing embodiments, photoelectric switch 92a, 92b is shown as an example of a rack detecting element, and the front longitudinal support post of rack 1, 2 is shown as an example of a detectable element. Alternatively, magnetic proximity switches may be used as rack detecting elements, and magnetic materials disposed in each storage space may be used as detectable elements.

What is claimed is:

1. A rack arrangement including a pair of longitudinally extending stationary racks having a plurality of vertically and laterally partitioned storage spaces and arranged in parallel spaced apart relation, longitudinally extending movable racks having a plurality of vertically and laterally partitioned storage spaces and frontwardly and rearwardly movably disposed between the stationary racks, and a working space defined between opposite facades of any selected pair of adjacent racks, comprising:

a pair of rails mounted respectively on the tops of said stationary racks and supported thereon, a girder supported by the rails and guided thereby for movement along the rails, movable means supported and guided by the girder for movement in a longitudinal direction of the girder which is perpendicular to said rails, said movable means being movable into said working space, and a take-in/take-out device which is vertically movable within the movable means and capable of supporting a load for storage into one of said storage spaces, said take-in/take-out device being adapted to extend into and retreat from a storage space located opposite to said movable means for delivery of the load to and from the storage space.

2. A rack arrangement as set forth in claim 1, further comprising a load handling station provided externally of one end of the longitudinally extending rack, said movable means being back and forth movable between said working space and said load handling station and also movable along the length of the load handling station, and a load holder block provided at said load handling station for delivery of the load to and from said movable means.

3. A rack arrangement as set forth in claim 2, wherein said load holder block is securely set at a predetermined position.

4. A rack arrangement as set forth in claim 2, wherein said load holder block is back and forth movable.

5. A rack arrangement as set forth in claim 2, wherein said load holder block is provided in the load handling station at a location external of one end of each stationary rack, and wherein said rack arrangement includes conveyor means provided in said load handling station, said conveyor means including a pair of delivery portions extending from one side of the respective load holder blocks in a direction away from the respective stationary racks and each having an outer end, and a storage portion interconnecting the outer ends of said delivery portions.

6. A rack arrangement as set forth in claim 2, wherein said load holder block is provided in the load handling station at a location external of one end of at least one of said stationary racks.

7. A rack arrangement as set forth in claim 2, further comprising moving track means extending in a direction away from the racks as viewed in a longitudinal direction thereof, said load holder blocks being reciprocatively movable on said moving track means.

8. A rack arrangement as set forth in claim 7, wherein said load holder blocks each is provided at a location external of one end of each stationary rack, and wherein between the two load holder blocks there are provided at least one separate moving track means extending in a direction away from the racks as viewed in a longitudinal direction thereof, and an intermediate load holder block which is reciprocatively movable on said separate moving track means.

9. A rack arrangement as set forth in claim 1, further comprising load handling stations provided externally of the opposite ends of the racks, said movable means being back and forth movable between said working space and each of said load handling stations and also movable along the length of each load handling station, and a load holder block provided at each load handling station for delivery of a load to and from said movable means.

10. A rack arrangement as set forth in claim 1, further comprising means for detecting the width of the working space.

11. A rack arrangement as set forth in claim 1, wherein the stationary and movable racks each have vertically extending support posts as component members thereof, the support posts of each movable rack extending up to a median level of the height of the uppermost storage spaces, the support posts of each stationary rack being of a length sufficient to form the storage spaces of up to the uppermost level.

12. A rack arrangement as set forth in claim 1, wherein said movable means is suspendedly supported by the girder, said movable means comprising a horizontal upper frame supported by said girder, a pair of vertical posts depending from opposite ends, right and left, of said upper frame, a horizontal lower frame interconnecting the lower portions of said posts, and a vertical frame extending vertically from one lower end of said upper frame along one side of at least one of the posts and provided for reinforcing said at least one post, said vertical flat frame being thicknesswise oriented in a longitudinal direction of said rack arrangement.

13. A rack arrangement as set forth in claim 12, wherein said vertical frame comprises a longitudinal member depending from one end of the upper frame as viewed in a transverse direction of the rack assembly, a plurality of lateral members, upper and lower, interconnecting the longitudinal member and the post, an oblique member obliquely extending between adjacent lateral members to interconnect the longitudinal member and the post, said vertical frame thus serving as a ladder.

14. A rack arrangement as set forth in claim 1, further comprising a floor, said floor having, in a portion thereof in which said working space is provided, a guide rail laid thereon which extends in a longitudinal direction of said rack arrangement, said movable means including means engageable with the guide rail to position said take-in/take-out device.

15. A rack arrangement as set forth in claim 1, further comprising rack detecting means provided in said take-in/take-out device, a detectable element disposed in each of said storage spaces for being detected by said rack detecting means, and means for causing said take-in/take-out device to project a given stroke from a detected position when said rack detecting means has detected said detectable member.

* * * * *